US012485570B2

United States Patent
Berg et al.

(10) Patent No.: US 12,485,570 B2
(45) Date of Patent: Dec. 2, 2025

(54) GREEN PROCESS FOR MODIFYING WOOD

(71) Applicants: Alex Berg, Coronel (CL); Roland Fritsch, Evans, GA (US); Joel Kier, New York, NY (US); Kurt Malzer, Grovetown, GA (US)

(72) Inventors: Alex Berg, Coronel (CL); Roland Fritsch, Evans, GA (US); Joel Kier, New York, NY (US); Kurt Malzer, Grovetown, GA (US)

(73) Assignee: T2EARTH HOLDINGS LLC, Jericho, NY (US)

( * ) Notice: Subject to any disclaimer, the term of this patent is extended or adjusted under 35 U.S.C. 154(b) by 887 days.

(21) Appl. No.: 17/112,568

(22) Filed: Dec. 4, 2020

(65) Prior Publication Data

US 2021/0170623 A1    Jun. 10, 2021

Related U.S. Application Data

(60) Provisional application No. 63/068,211, filed on Aug. 20, 2020, provisional application No. 62/944,858, filed on Dec. 6, 2019.

(51) Int. Cl.
*B27K 3/20* (2006.01)
*B27K 3/02* (2006.01)
*B27K 3/18* (2006.01)

(52) U.S. Cl.
CPC .............. *B27K 3/20* (2013.01); *B27K 3/0214* (2013.01); *B27K 3/0292* (2013.01); *B27K 3/18* (2013.01); *B27K 2200/10* (2013.01); *B27K 2200/30* (2013.01); *B27K 2240/20* (2013.01); *B27K 2240/30* (2013.01)

(58) Field of Classification Search
CPC .......... B27K 3/18; B27K 3/20; B27K 3/0292; B27K 3/32
See application file for complete search history.

(56) References Cited

U.S. PATENT DOCUMENTS

| | | | |
|---|---|---|---|
| 1,076,553 A * | 10/1913 | Dautreppe | B27K 3/08 427/382 |
| 3,306,765 A * | 2/1967 | Du Fresne | C09K 21/02 428/921 |
| 6,040,057 A | 3/2000 | Slimak et al. | |
| 6,146,766 A | 11/2000 | Slimak et al. | |
| 6,303,234 B1 | 10/2001 | Slimak et al. | |
| 6,827,984 B2 | 12/2004 | Slimak et al. | |
| 7,297,411 B2 | 11/2007 | Slimak et al. | |
| RE40,517 E | 9/2008 | Slimak et al. | |
| 7,497,900 B2 * | 3/2009 | Hu | C09D 5/14 106/18.32 |
| 7,995,711 B2 | 8/2011 | Hirschberg et al. | |
| 8,974,910 B2 * | 3/2015 | Nicholson | C08L 65/00 427/393 |
| 12,138,823 B2 * | 11/2024 | Chlandová | B27N 9/00 |

FOREIGN PATENT DOCUMENTS

| | | | |
|---|---|---|---|
| CL | 2017000301 | 1/2018 | |
| CL | 2019003656 | 7/2020 | |
| CN | 101870130 | 10/2010 | |
| CN | 108453854 | 8/2018 | |
| FR | 455556 | 8/1913 | |
| JP | S55-010704 U | 1/1980 | |
| JP | 2001-001306 | 1/2001 | |
| JP | 2001001306 A * | 1/2001 | ............... B27K 3/15 |
| JP | 2002-120204 | 4/2002 | |
| KR | 20120020681 | 3/2012 | |
| WO | WO 2016/022032 A2 | 2/2016 | |

OTHER PUBLICATIONS

Machine translation of JP2001-001306 (Michio) (Year: 2001).*
Office Communication dated Feb. 18, 2021 issued in International Patent Application No. PCT/US2020/063402.
Park et al., "Combustion Characteristics of Spruce Wood by Pressure Impregnation with Waterglass and Carbon Dioxide," Journal of Korean Institute of Fire Science and Engineering, Aug. 31, 2012, pp. 18-23, vol. 26, No. 4.
Office Action dated Jan. 28, 2023 issued in Chinese Patent Application No. 202080092996.7.
Hyung-Ju Park et al., "Combustion Characteristics of Spruce Wood by Pressure Impregnation with Waterglass and Carbon Dioxide", Journal of Korean Institute of Science and Engineering, vol. 26, No. 4, pp. 18-23, 2012.
Jerrold E. Winandy, The Chemistry of Wood Strength https://www.researchgate.net/publication/241659636; Apr. 2, 2018; 48 pages.
Search Report and Written Opinion dated May 6, 2021 issued in International Patent Application No. PCT/US2020/063402.
Office Action dated Dec. 14, 2023 issued in Chilean Patent Application No. 202201474.
Notification of Reasons for Refusal dated Oct. 15, 2024, issued in Japanese Patent Application No. 2022-534217, 8 pages.

(Continued)

*Primary Examiner* — Michael P Wieczorek
(74) *Attorney, Agent, or Firm* — COZEN O'CONNOR

(57) ABSTRACT

This invention relates to a process for modifying wood. The process comprises treating the wood with an impregnating solution comprising an alkali metal (or alkaline earth metal) silicate, under conditions sufficient to impregnate the wood with one or more of the components of the impregnating solution. The process can comprise an optional second impregnation with a second impregnating solution. The process also comprises adding gaseous carbon dioxide to the treated wood, in the absence or presence of water, under pressure ranging from about 2 to about 12 bars, thereby lowering the pH of the treated wood to about 11 or below, to stabilize and/or fix the components of the impregnating solution in the wood. The process is green, non-toxic, and the resulting modified wood or wood product can be used across all primary construction and infrastructure applications.

19 Claims, 22 Drawing Sheets

(56) References Cited

OTHER PUBLICATIONS

Sun Min-yang, Cao Jin-zhen, "Penetration of SiO2 sols in sapwood of Scots pine and loblolly pine", Journal of Beijing Forestry University (2015) 37 (9) 85-90.
J Solution Chem (2008) 37: 73-83 The Viscosity Properties of Sodium Silicate Solutions; Xiachong Yang Welling Zhu Qiao Yang.
National Silicates, PQ Corporation: company document "Fundamentals of Silicate Chemistry", 2005, 2 pages.
ICC-ES Evaluation Report ESR-4627—Reissued Mar. 2025 pp. 1-6.

\* cited by examiner

A) ABOVE

D) ABOVE

B) ABOVE

E) ABOVE

C) ABOVE

GREEN PROCESS FOR MODIFYING WOOD

This application claims priority to U.S. Provisional Application No. 62/944,858, filed on Dec. 6, 2019, and U.S. Provisional Application No. 63/068,211, filed on Aug. 20, 2020; both of which are herein incorporated by reference in their entirety.

FIELD OF THE INVENTION

This invention generally relates to a green (non-toxic) and environmentally sustainable process for modifying wood.

DISCUSSION OF RELATED ART

The social and environmental benefits of all-green wood are significant, including eliminating the need for the toxic chemical treatment of wooden utility poles, railway ties, home construction, boardwalks, and decks, while enhancing strength and fire resistance ratings appropriate to be used in areas prone to fire. Considering utility poles as an example: the negative economic and social disruption consequences of utility company-linked wildfires is extraordinary especially in the Western USA. In 2017 alone, wildfires in the state of California killed dozens of people, destroyed thousands of homes and businesses, and damaged tens of thousands of other properties—these losses were estimated at $12 billion. The record-breaking 2020 fire season has seen enormous wildfires tearing across California and other states in the West. More than five million acres have burned across California, Colorado, Idaho, Montana, Oregon and Washington State in 2020 year to date. The costs for all the wildfires in 2018 are estimated to be over $20 billion, and a similar calculation would apply to the costs for the wildfires in 2020. An affordable fire retardant lumber utility pole with fire retardant cross arms would have a materially positive impact on these statistics. However, there currently is no all-wood, low price, fully environmentally sustainable Class A fire retardant industry-approved utility pole.

Lumber has been treated with solutions of elements and compounds to improve characteristics and lengthen lifecycle, with varying degrees of success. Treated wood is typically referred to as wood that has been treated with preservative chemicals. A typical treatment method would include impregnating the wood product with treatment chemicals that can result in wood product that is fire resistant, mold resistant, and insect resistant. Many different chemicals have been used for these purposes, including many non-green, toxic compounds such as arsenic or copper based compounds, pesticides, etc. The Federal Insecticide, Fungicide, and Rodenticide Act (FIFRA), requires all pesticides sold or distributed in the United States to be registered by the EPA. Most of the current wood chemical preservatives (either waterborne or oil-type) are registered pesticides regulated by the US EPA. Existing wood products are still made with flammable, toxic to humans, environmentally damaging treatment chemicals.

U.S. Pat. No. 7,955,711 describes an aqueous solution for the preservation of wood and wood products. However, the treatment solution includes chemicals for insect and termite repellant to achieve termite and/or insect resistance. These chemicals are present in a relatively high concentration of about 1.5 to 9% by wt., which can be environmentally damaging. The U.S. Pat. No. 7,995,711 patent also employs an alkali metal carbonate (e.g., $Na_2CO_3$) at about 1 to 10% by wt., which may leave high levels of $Na_2CO_3$ residual on the surface of the treated lumber, causing efflorescence on the surface of the finished product.

U.S. Pat. Nos. 6,303,234, 6,827,984, and 7,297,411 describe a process of using sodium silicate solution to create fire retardant products. However, these patents discuss the problems of the water solubility and the surface deterioration resulting from exposure to air and moisture that are associated with using sodium silicate alone and require that the sodium silicate treated wood samples be further treated by the deposition of a molecular coating of silicon oxide, in order to avoid the aforementioned problems. This surface molecular coating treatment specifically resulted in an internal failure of the treated lumber after approximately 40-48 months in various applications in multiple locations. Additionally, these patents prefer a high concentration of above 20% by wt. sodium silicate, as the flame resistance tended to increase with increasing the concentration.

U.S. RE40517 describes a process of using sodium silicate solution to create fire retardant and moisture resistance products, by applying energy to cause sodium silicate to become water insoluble. Similar to the above patents, this patent also prefers a high concentration of above 20% by wt. sodium silicate, as the flame resistance tended to increase with increasing the concentration.

U.S. Pat. No. 6,146,766 describes a process of using sodium silicate solution to create fire retardant and moisture resistance products, by alternately applying vacuum and pressure to cause sodium silicate to become water insoluble. The patent does not discuss the concentration of sodium silicate solution at all.

None of the aforementioned patents discusses the disadvantages associated with employing a higher concentration of sodium silicate impregnation solution. These patents are also completely silent regarding the weight ratio of $(SiO_2)/(Na_2O)$ of the sodium silicate in the impregnating solution and the benefits associated with controlling this ratio. Moreover, these patents do not employ a gaseous $CO_2$ fixation technology. Without a reliable fixation strategy, the treated wood may have issues relating to longer-term lifecycle protection of the wood product. Additionally, these patents do not envision any additional impregnating stages and the benefits associate with the additional steps.

Thus, there remains a need to develop a cost-efficient, all-green process for modifying wood which can eliminate the toxic chemical treatment, yet provide enhancing strength properties, increased fire resistance ratings that meet or exceed international recognized building and building materials standards, while maintaining other desirable properties such as rot, bacteria, and insect resistance. This disclosure addresses that need.

SUMMARY OF THE INVENTION

A purpose of this invention is to design and produce totally environmentally sustainable, green (toxic chemical-free), and break-through performance wood products that can be widely utilized across all primary construction and infrastructure applications. The production process to produce the wood products utilizes a low cost and scalable continuously improving manufacturing process primarily using existing wood treatment infrastructure that previously used toxic chemical focused manufacturing processes. Existing infrastructure can be rapidly converted to sustainable wood modification facilities at a highly compelling return on investment basis such that the entire conversion investment can be returned within 12 months. The result is the maintaining of existing lumber production and treatment manufacturing facilities, while also economically converting previously toxic chemical centric and environment damaging operations into a profitable, long-term, sustainable "green" lumber business model. The inventors believe, to the best of their knowledge, that the combination of an all-green, low cost, high-performance lumber product that is produced in green-tech lumber treatment facilities in the United States (using U.S. domestic sourced, responsibly harvested lumber) has not been accomplished before.

The product is a modified all-green wood, sourced from the largest renewable US forests, which uses specialized technology and compounds in a scalable formulation and manufacturing process to enhance the performance of everyday wood. The result is an industry leading array of performance profiles in a single, very price competitive product. The main performance enhancements include rendering the wood resistant to chemical leaching, inert, stronger, harder, rot-resistant, termite-resistant, electrical-resistant, and importantly a Class A (highest level) fire-retardant material, as compared to the commonly available and used alternatives, both the non-sustainable conventionally treated woods as well as several high price sustainable chemically and process enhanced woods.

The inventors believe their processes can be used to produce the first Class A fire retardant industry-approved utility pole to meet these criteria and to be used and approved by the electrical power industry due to the unique combination of product performance attributes from the invention, as well as its ability to be manufactured at prices comparable to the toxic chemical treated, flammable ones used today. This is a significant step towards electrical utility fire suppression and will result in a reduction in environmental damage caused by the highly toxic chemicals currently utilized in utility poles many of which become airborne once a wildfire starts and further jeopardize the safety of first responder fire-fighting teams and the surrounding communities.

Processes are disclosed for the impregnation of lumber with a solution of alkali metal salt, such as sodium silicate ($Na_2SiO_3$), along with resulting products. Post impregnation stabilization may also be provided. Various methods of stabilization are disclosed, such as lowering pH and by the addition of gaseous carbon dioxide ($CO_2$) and application of an optional second impregnation treatment of the wood. Post impregnation heat treatments are also disclosed. Such processes are useful to fix and stabilize the impregnation of lumber.

Accordingly, one aspect of the invention relates to a process for modifying wood. The process comprises treating the wood with an impregnating solution comprising an alkali metal (or alkaline earth metal) silicate, under conditions sufficient to impregnate the wood with one or more of the components of the impregnating solution, wherein the weight ratio of $SiO_2$ to alkali metal (or alkaline earth metal) oxide in the alkali metal (or alkaline earth metal) silicate ranges from about 2.0 to about 4.0. The process also comprises adding gaseous carbon dioxide to the treated wood, in the absence or presence of water, under pressure ranging from about 2 to about 12 bars, thereby lowering the pH of the treated wood to about 11 or below, to stabilize and/or fix the components of the impregnating solution in the wood. This process is green, non-toxic as being carried out in the absence of a pesticide or biocide, or as being carried out with an environmentally safe boron level in the impregnating solution of no more than 1% by wt.

In one embodiment, the process is green, non-toxic as being carried out in the absence of a pesticide or biocide. In one embodiment, the process is green, non-toxic as being carried out in the absence of a mold repellant. In one embodiment, the process is green, non-toxic as being carried out in the absence of a toxic chemical.

In certain embodiments, the alkali metal (or alkaline earth metal) silicate is sodium silicate, potassium silicate, or calcium silicate. Typically, the alkali metal silicate is sodium silicate or potassium silicate. In certain embodiments, the weight ratio of $(SiO_2)/(Na_2O)$ of the sodium silicate in the impregnating solution can range from about 2.1 to about 3.5, or from about 2.5 to about 3.5. In certain embodiments, the concentration of $SiO_2$ in the impregnating solution ranges from about 3% by wt. to about 15% by wt. In one embodiment, the concentration of $SiO_2$ in the impregnating solution ranges from about 3% by wt. to about 6% by wt.

In certain embodiments, the process further comprises, prior to the treating step, a step of pretreating the wood by drying the wood and/or applying a vacuum to the wood, to achieve a moisture content of the wood of less than about 20%.

In certain embodiments, the conditions sufficient to impregnate the wood in the treating step comprise two or more of the following conditions:
  the concentration of $SiO_2$ in the impregnating solution ranges from about 3% by wt. to about 15% by wt.;
  the weight ratio of $(SiO_2)/(Na_2O)$ of the sodium silicate in the impregnating solution ranges from about 2.5 to about 3.5;
  applying a pressure of about 4 bars to about 20 bars;
  treating the wood at a temperature ranging from about 15 to about 100° C.; and/or
  treating the wood for a period of time from about 2 to about 4 hours.

The conditions sufficient to impregnate the wood in the treating step may also comprise three, four, or all five of the above conditions.

In one embodiment, the conditions sufficient to impregnate the wood in the treating step comprise the following steps:
  the concentration of $SiO_2$ in the impregnating solution ranges from about 5% by wt. to about 10% by wt.;
  the weight ratio of $(SiO_2)/(Na_2O)$ of the sodium silicate in the impregnating solution ranges from about 2.8 to about 3.2;
  applying a pressure of about 10 bars to about 20 bars;
  treating the wood at a temperature ranging from about 50 to about 80° C.; and
  treating the wood for a period of time from about 2 to about 4 hours.

In one embodiment, the conditions sufficient to impregnate the wood in the treating step comprise the following steps:
  the concentration of $SiO_2$ in the impregnating solution ranges from about 5% by wt. to about 15% by wt.;
  the weight ratio of $(SiO_2)/(Na_2O)$ of the sodium silicate in the impregnating solution ranges from about 2.8 to about 3.2;
  applying a pressure of about 10 bars to about 20 bars;
  treating the wood at a temperature ranging from about 20 to about 50° C.; and
  treating the wood for a period of time from about 2 to about 4 hours.

In certain embodiments, the gaseous carbon dioxide is added under a pressure ranging from about 6 to about 12 bar for a period of time from about 15 to about 60 minutes, to lower the pH of the treated wood to about 9 or below. In one embodiment, the gaseous carbon dioxide is added under a pressure ranging from about 2.4 to about 7 bar for a period of time from about 15 to about 60 minutes, to lower the pH of the treated wood to about 9 or below.

In certain embodiments, the process further comprises, after the treating step, a step of applying a vacuum to the treated wood to remove residual impregnating solution from the surface of the treated wood and prepare the treated wood for the post-treatment steps.

In certain embodiments, the process further comprises, after the treating step, heating the treated wood at a temperature ranging from about 50 to about 100° C. The heating step comprises heating the treated wood with dry air, saturated water vapor, or hot water. In one embodiment, the heating step has a duration of about 2 to about 6 days (or from about 4 to about 6 days) and comprises varying the rate of increasing the temperature to the stabilized drying temperature and the rate of decreasing the temperature to achieve the desired moisture level target.

Another aspect of the invention relates to a process for modifying wood. The process comprises:
i) treating the wood with a first impregnating solution comprising an alkali metal (or alkaline earth metal) silicate, under conditions sufficient to impregnate the wood with one or more of the components of the first impregnating solution;
ii) treating the wood with a second impregnating solution comprising an alkali metal (or alkaline earth metal) silicate at a concentration higher than the concentration of the first impregnating solution, for a period of time shorter than the treating step i); and
iii) carrying out one or more of the following post-treatment step(s) to stabilize and/or fix the components of the first and/or second impregnating solution in the wood:
adding gaseous carbon dioxide to the treated wood, in the absence or presence of water, under a pressure ranging from about 2 to about 12 bars, thereby lowering pH of the treated wood to about 11 or below, and/or
heating the treated wood at a temperature ranging from about 50 to about 100° C.,
wherein the post-treatment step iii) is carried out after the treating step i), prior to the treating step ii), and/or after the treating step ii).

In certain embodiments, the treating step ii) comprises the following conditions:
the second impregnating solution comprises an alkali metal (or alkaline earth metal) silicate at a concentration of about 10 to 15% by wt.;
treating the wood for a period of time from about 10 to about 60 minutes,
applying a pressure of about 2 to about 12 bars, and
treating the wood a temperature ranging from about 20 to about 70° C.

In certain embodiments, the process is green, non-toxic as being carried out in the absence of a pesticide or biocide, or as being carried out with an environmentally safe boron level in the first or second impregnating solution of no more than 1% by wt.

In one embodiment, the process is green, non-toxic as being carried out in the absence of a pesticide or biocide. In one embodiment, the process is green, non-toxic as being carried out in the absence of a mold repellant. In one embodiment, the process is green, non-toxic as being carried out in the absence of a toxic chemical.

In certain embodiments, the alkali metal (or alkaline earth metal) silicate is sodium silicate, potassium silicate, or calcium silicate. Typically, the alkali metal silicate is sodium silicate or potassium silicate. In certain embodiments, the weight ratio of $(SiO_2)/(Na_2O)$ of the sodium silicate in the first and/or second impregnating solution can range from about 2.0 to about 4.0, from about 2.1 to about 3.5, or from about 2.5 to about 3.5.

In certain embodiments, the concentration of $SiO_2$ in the first impregnating solution ranges from about 3% by wt. to about 15% by wt. In one embodiment, the concentration of $SiO_2$ in the first impregnating solution ranges from about 3% by wt. to about 6% by wt. The concentration of $SiO_2$ in the second impregnating solution ranges from about 10 to 15% by wt.

In certain embodiments, the process further comprises, prior to the treating step i), a step of pretreating the wood by drying the wood and/or applying a vacuum to the wood, to achieve a moisture content of the wood of less than about 20%.

In certain embodiments, the conditions sufficient to impregnate the wood in the treating step i) comprise two or more of the following conditions:
the concentration of $SiO_2$ in the first impregnating solution ranges from about 3% by wt. to about 15% by wt.;
the weight ratio of $(SiO_2)/(Na_2O)$ of the sodium silicate in the first impregnating solution ranges from about 2.5 to about 3.5;
applying a pressure of about 4 bars to about 20 bars;
treating the wood at a temperature ranging from about 15 to about 100° C.; and/or
treating the wood for a period of time from about 2 to about 4 hours.

The conditions sufficient to impregnate the wood in the treating step i) may also comprise three, four, or all five of the above conditions.

In one embodiment, the conditions sufficient to impregnate the wood in the treating step i) comprise the following steps:
the concentration of $SiO_2$ in the first impregnating solution ranges from about 5% by wt. to about 10% by wt.;
the weight ratio of $(SiO_2)/(Na_2O)$ of the sodium silicate in the first impregnating solution ranges from about 2.8 to about 3.2;
applying a pressure of about 10 bars to about 20 bars;
treating the wood at a temperature ranging from about 50 to about 80° C.; and
treating the wood for a period of time from about 2 to about 4 hours.

In one embodiment, the conditions sufficient to impregnate the wood in the treating step i) comprise the following steps:
the concentration of $SiO_2$ in the first impregnating solution ranges from about 10% by wt. to about 15% by wt.;
the weight ratio of $(SiO_2)/(Na_2O)$ of the sodium silicate in the first impregnating solution ranges from about 2.8 to about 3.2;
applying a pressure of about 10 bars to about 20 bars;
treating the wood at a temperature ranging from about 20 to about 50° C.; and
treating the wood for a period of time from about 2 to about 4 hours.

In certain embodiments, the post-treatment step iii) comprises adding gaseous carbon dioxide to the treated wood, in the absence or presence of water, under a pressure ranging from about 2 to about 12 bars, thereby lowering pH of the treated wood to about 11 or below.

In certain embodiments, the gaseous carbon dioxide is added under a pressure ranging from about 6 to about 12 bar for a period of time from about 15 to about 60 minutes, to lower the pH of the treated wood to about 9 or below. In one embodiment, the gaseous carbon dioxide is added under a pressure ranging from about 2.4 to about 7 bar for a period of time from about 15 to about 60 minutes, to lower the pH of the treated wood to about 9 or below.

In certain embodiments, the post-treatment step iii) comprises heating the treated wood at a temperature ranging from about 50 to about 100° C. The heating step comprises heating the treated wood with dry air, saturated water vapor, or hot water. In one embodiment, the heating step has a duration of about 2 to about 6 days (or from about 4 to about 6 days) and comprises varying the rate of increasing the temperature to the stabilized drying temperature and the rate of decreasing the temperature to achieve the desired moisture level target.

Another aspect of the invention relates to wood (or wood product) modified by the processes discussed in all above aspects and all above embodiments relating to a process for modifying wood.

In certain embodiments, the wood is lumber, lumber board, lumber pole, laminated lumber, single plate laminate, plywood, particle board, or fiber board. The lumber may be any softwood or coniferous species such as southern yellow pine, radiata pine (*Pinus radiata*), hemlock, or fir, for example.

In certain embodiments, the modified wood (or wood product) is inert, rot resistant, fire resistant, termite resistant, bacteria resistant, and/or fungus resistant. The modified wood (or wood product) also has an improved strength as compared to unmodified wood, characterized by at least 35% increase in Modulus of Elasticity (MOE) and at least 4% increase in Modulus of Rupture (MOR), measured by ASTM D143-14. The modified wood also has an improved strength as compared to wood treated by a conventional phosphate-based impregnation process, characterized by at least 100% increase in Modulus of Elasticity (MOE) and at least 15% increase in Modulus of Rupture (MOR), measured by ASTM D143-14.

The resulting products are inert, namely, neither chemically nor biologically reactive and will not decompose, rot resistant, fire resistant, termite resistant, bacteria resistant, and/or fungus resistant, and with superior strength properties as compared to non-impregnated stabilized lumber, resulting in extended lifetimes. The resulting products are also non-toxic and entirely environmentally safe. Lumber for residential and commercial construction, railroads (for railway ties) and phone and electric utilities (for utility poles) and other applications, may be made in accordance with the disclosed processes. In some examples, significant carbon sequestration is provided.

Embodiments of the invention also provide a fire retardant wood (or wood product) modified by the process discussed in all above aspects and all above embodiments relating to a process for modifying wood.

In certain embodiments, the fire retardant wood (or wood product) modified by the process according to this invention satisfies the Class A fire retardant rating, measured by ASTM E84 10-minute burn test. In this test, the fire retardant wood modified by the process according to this invention does not exceed the 6' flame spread limit (10.5' total from the burner as per the ASTM E84 standard which adds 4.5' to the burner position). The fire retardant wood modified by the process according to this invention has an improvement of 170% as compared to wood treated by a conventional phosphate-based impregnation process (against the 6' flame spread limit (10.5' total from the burner as per the ASTM E84 standard which adds 4.5' to the burner position).

In certain embodiments, the fire retardant wood (or wood product) modified by the process according to invention satisfies the Class A fire retardant rating, measured by ASTM E2768 30-minute burn test. In this test, the fire retardant wood modified by the process according to this invention does not exceed the 6' flame spread limit (10.5' total from the burner as per the ASTM E2768 standard which adds 4.5' to the burner position). The fire retardant wood modified by the process according to this invention has an improvement of 350% as compared to wood treated by a conventional phosphate-based impregnation process (against the 6' flame spread limit).

In certain embodiments, the modified wood (or wood product) can be used in the manufacturing all-green fire-retardant high-performance railway ties, which are another major infrastructure need.

In certain embodiments, the modified wood (or wood product) has superior strength properties, as compared to toxic chemically treated lumber, insect resistance and rot resistance, and can be used in various products in constructions including framing, siding, structural supports, railings, landscaping, and all areas where dimensional lumber and plywood is utilized. FIG. 30 illustrates the comprehensive range of construction applications for the invention. The resulting product also has a significant impending use to work with CLT (cross laminated timber) in a new generation of affordable, low carbon sustainable housing construction, an acute and growing necessity in the U.S. The all green, high-performance wood reduces carbon impacts, petroleum dependence, exposure of waters and wetlands to toxic leaching chemicals, and is also sourced entirely from responsibly managed and sustainable American forests.

BRIEF DESCRIPTION OF THE DRAWINGS

FIG. 12A shows the increase in mass (%) of the wood samples impregnated with sodium silicate at 10% silicon dioxide and FIG. 12B shows the increase in increase in mass (%) of the wood samples impregnated with sodium silicate at 15% silicon dioxide.

DETAILED DESCRIPTION OF THE PRESENTLY PREFERRED EMBODIMENTS

Figure 1:
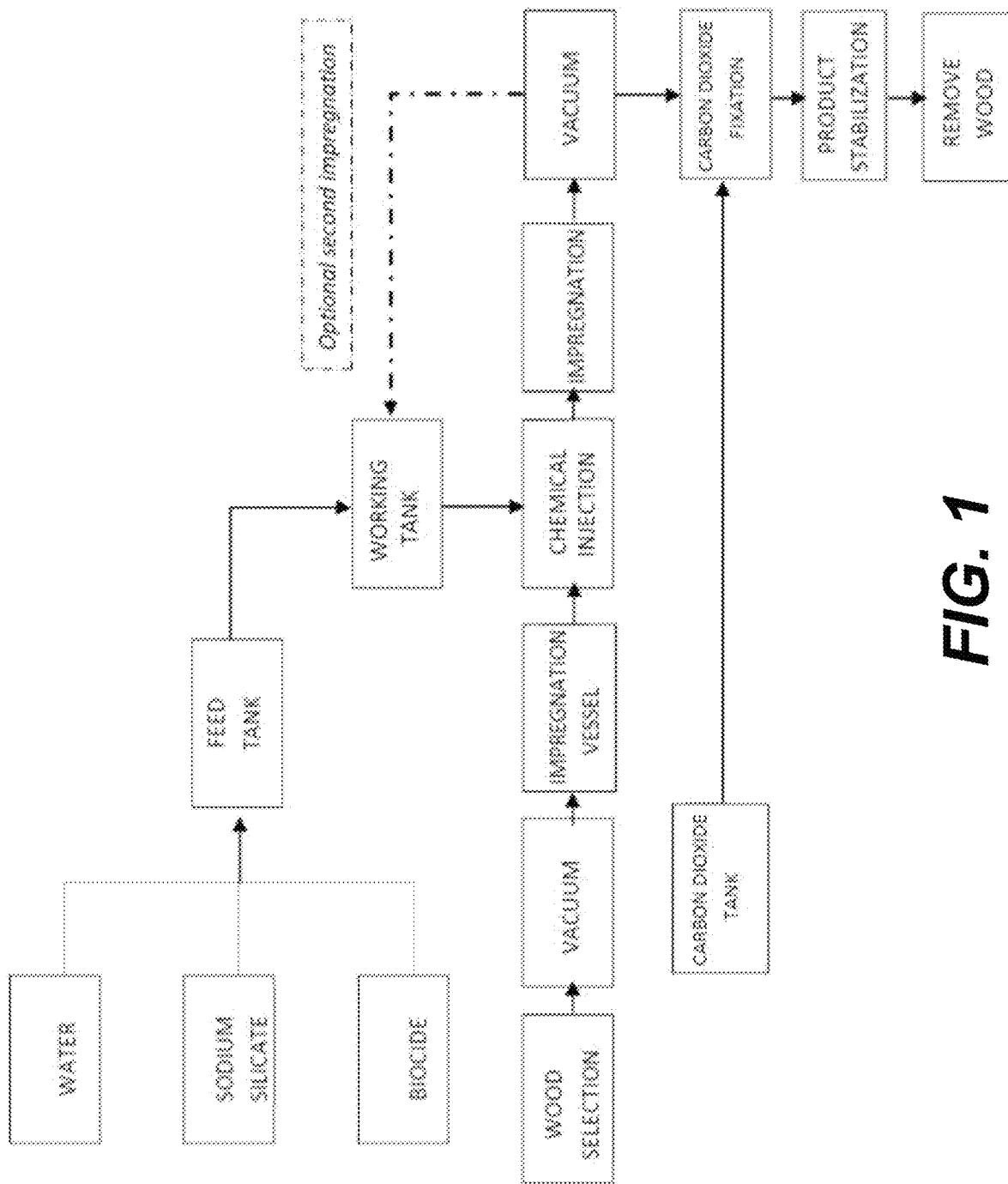
FIG. 1 is a flow chart showing an exemplary implementation of the wood modification process.

Aspects of the invention relate to the infusion of wood (lumber) and other cellulosic material with a soluble alkali metal silicate solution, such as a sodium silicate solution, optionally under vacuum and/or pressure, and optionally applying post impregnation stabilization through the addition of carbon dioxide and/or heat treatment after infusion to render the alkali metal silicate solution insoluble, for the purpose of enhancing the mechanical properties, rot-resistance, insect resistance, and/or fire-retardant nature of wood (lumber) and other cellulosic material.

The Modification Process

Procedures to impregnate cellulosic material, such as forms of southern yellow pine (*Pinus taeda* and *Pinus elliotil*) species, in the form of dimensional lumber, plywood, cross laminated timber (CLT), KD 19 dry planed lumber, as well as railroad cross ties, utility poles, utility cross arms and green untreated lumber, for the purpose of improving some or all of the wood sourced material's performance characteristics listed above, are disclosed.

Embodiments of the invention include various wood modification processes with a single or double impregnation of an alkali silicate solution, such as sodium silicate or calcium silicate.

The U.S.D.A.'s National Forest Service Library defines modified wood as "wood that is processed by chemical treatment, compression, or other means, with or without heat, to impart permanent properties quite different from those of the original wood." The aim of modified wood is to overcome the shortcomings of standard wood. Conventional wood treatments usually employ non-sustainable chemicals including EPA registered preservatives common today. In contrast, the wood modification processes described in various aspects of this invention are environmentally friendly and the modified wood materials can be safely and easily deposed of at the end of the product lifecycle.

Various treatment conditions for modifying the wood include, but are not limited to, the following aspects.

Impregnation

The "less is more" concept. Alkaline salt impregnations typically use a relatively high concentration of sodium silicate (+15% by wt. as measured as silicon dioxide content) for the purpose of enhancing the wood properties. The concentration of $SiO_2$ in the impregnating solution during the impregnation process can be controlled in a range from about 3% by wt. to about 35% by wt., from about 3% by wt. to about 15% by wt., from about 5% by wt. to about 15% by wt., from about 5% by wt. to about 10% by wt., or from about 3% by wt. to about 6% by wt. In certain embodiments, the process utilizes a lower concentration (3% by wt. to 15% by wt.) to better infuse the lumber and provide the fundamental protection properties desired. A lower concentration means a beneficially lower viscosity, as a higher viscosity may negatively affect the impregnation process. Additionally, at higher concentration and temperature of impregnation, alkali metal (or alkaline earth metal) silicate solution tends to form thin silicate films on the wood samples, commonly known as efflorescence, which may negatively affect the impregnation process. The "less is more" method using the low, specific silicon dioxide concentration levels allows for both a superior performance product including the long-term environmental attributes and, just as importantly, a much more affordable and competitive price product given the lower amounts of sustainable treatment solution utilized in the new production method, as well as with the lower amounts of manufacturing cost infrastructure and therefore depreciation cost (from the proprietary design, rapid return conversion of existing facilities to all-green wood plants). Together these factors are fundamental and ground-breaking and allow for large scale price-sensitive construction and infra-structure industries adoption of the all-green high-performance modified wood, and thereby significantly higher positive impact of the products (and process) on the environment and their ability to realize the invention's full potential to improve the planet. In addition, the new all-green high-performance wood can utilize readily available sustainable sources of U.S. lumber, further reducing transportation costs and negative carbon impact from long-distance sourced imported products.

An impregnation time may be selected to allow the alkali metal (or alkaline earth metal) silicate to enter the cell structure of the woody material. The impregnation time varies according to the dimensions for the lumber being treated. The reaction time during the impregnation process may range from about 20 minutes to about 10 hours, from about 20 minutes to about 120 minutes, from about 45 minutes to about 5 hours, from about 0.5 hour to about 4 hours, or from about 1.5 hours to about 4 hours. For conventional 2×4 lumber boards, decking and fencing material, and other smaller dimensioned lumber, for example, the impregnation time may be from about 45 minutes and 5 hours, depending in part on the size of the lumber. For certain large pieces of lumber, the reaction time can be extended to about 10 hours.

The temperature in the impregnation of alkali metal (or alkaline earth metal) silicate during the impregnation process may range from about 15° C. to about 100° C., from about 15° C. to about 80° C., or from about 50° C. to about 80° C. At higher concentration and temperature of impregnation, alkali metal silicate solution tends to form thin silicate films on the wood samples, commonly known as efflorescence, which may have hindered the impregnation process due to the deposition of silicate particles on the impregnating face of the wood sample.

Impregnation of alkali metal (or alkaline earth metal) silicate solution takes place with the liquid being forced by natural osmosis and applied pressure into the pores of the untreated lumber. The pressure applied during the impregnation process may be about 0.5 bar or higher, for instance, ranging from about 4 to about 20 bar, from about 10 to about 20 bar, or from about 6 bar (~100 psi) to about 18 bar (~250 psi).

Prior to the impregnation process, during raw materials selection and preparation, the wood may be pretreated to achieve a moisture content in the range of, for example, from about 12% to about 40%, less than about 20%, or from 18 to 20%, so as to maximize the efficiency and performance of the impregnation process. The pretreatment step may include drying the wood and/or applying a vacuum to the wood to achieve the desirable moisture content.

The ratio of $SiO_2/Na_2O$ in the impregnation of sodium silicate during the impregnation process can range from about 2.0 to about 4.0, from about 2.0 to about 3.5, from about 2.0 to about 3.5, from about 2.5 to about 3.5, or from about 2.8 to about 3.2. The ratio of $SiO_2/Na_2O$ can be an important factor in the impregnation process, in terms of pH control, level of impregnation control, and controlling the level of $Na_2CO_3$ residual on the surface of the treated lumber, thereby minimizing efflorescence ($Na_2CO_3$) on the surface of the finished product.

The pH of the impregnation solution in the impregnation process can be controlled to range from about 9.0 to about 13.5, about 11 or below, from about 9 to about 11, or about 9 or below, so as to maximize the efficiency and performance of the impregnation of sodium silicate process. Increasing the pH of the impregnating solution can result in agglomeration and polymerization of the silicon dioxide. One way to lower the pH of the impregnation solution is by adjusting the ratio of $SiO_2/Na_2O$ in the impregnation solution, as described herein. Another way to lower the pH is by applying carbon dioxide to the treated wood, as described herein.

The Longitudinal vs. Radial impregnation of sodium silicate in wood samples and wood production during the impregnation process may be controlled based, at least in part, on the dimensions of the wood being impregnated.

The impregnating solution can further comprise an environmentally safe biocide or preservative (or an environmentally safe amount of biocide or preservative). For instance, the biocide or preservative can optionally, include boron or a boron-containing compound, a bactericide, a fungicide, or a combination thereof.

Suitable boron or boron-containing compounds to be added to the impregnation solution include boron, boric acid, boron oxides, boric acid salts, borates, borax, or fluoro-boric acid salts. The addition of Boron-based biocide to the impregnation solution enhances resistance to rot and termite resistance performance of the impregnated wood. Boron is typically added as boric acid and added to the alkaline salt mixture and blended into a homogeneous liquid for use as the impregnation solution. However, boron or boron-containing compound, if added, is added in very low concentrations—no more than 1% by wt. to be environmentally safe. It is understood by one skilled in the art that when the boron level is above 1% by wt. it would not be considered as fully environmentally safe. In one embodiment, boron or boron-containing compound is added at no more than 0.75% by wt., or no more than 0.5% by wt. These levels are considered fully compliant to remain consistent with the products' claims as all-green non-toxic to the environment and humans. While boron tends to leach out of the wood in conventional treatment processes, the combination of the alkaline salt with the boron and the post impregnation stabilization processes of the invention will prevent this. Accordingly, and importantly, the impregnated wood is suitable for use in indoor and outdoor environments.

The process may also include stabilization/fixation of $SiO_2$ inside the wood impregnated with sodium silicate solution with one or more of the following steps.

Carbon Dioxide Fixation

After the first and/or the second impregnation step(s), $CO_2$ can be applied to the treated wood to stabilize or fix the $SiO_2$ in the pores of the wood. The $CO_2$ can be added to the treated wood in the absence or presence of water, under pressure, to lower the pH of the host cells of the lumber and cause the $SiO_2$ to precipitate and form a solid gel like substance in the pore structure, resulting in a solid matrix that materially increases strength properties and also renders the wood more resistant to fire, rot, termite attack and mold. Carbon dioxide is typically added in the gaseous form, where the $CO_2$ is compressed into the impregnation cylinder at pressures of between about 2 and 12 bars, between about 6 to about 12 bars, or between about 2.4 and about 7.0 bars. The residence time for this gaseous exposure may be between 15 minutes and 60 minutes, or about 20 to about 45 minutes, depending on the type of lumber being used.

Previous methods exposing the impregnated wood to $CO_2$ have been conducted at either an atmospheric pressure for a long period of about 8 hours or conducted at a high pressure at 300 to 800 psi for a few minutes. The $CO_2$ fixation discussed herein used a much lower pressure at about 2-12 bars (i.e., below 180 psi) for a period of 15 to 60 minutes. These ranges of pressure and fixation duration can ensure a better control of pH and a better result of wood resistance.

Thermal Treatment

After the impregnation step(s), a slow heat treatment can be applied to the treated wood to dry and cure $SiO_2$ impregnated in the wood. The heating step may be carried out by heating the treated wood with dry air (e.g., in a drying kiln), heating the treated wood with hot water, or heating the treated wood with saturated water vapor. For instance, impregnated lumber can be passed through a drying kiln for a second time (first time is for lumber moisture conditioning prior to impregnation), with a lower (hardwood regime) range of temperatures in the drying sequence. The post impregnation thermal treatment can typically be at a temperature ranging from about 50 to about 150° C., or from about 50 to about 100° C., for a period of time from about 2 to about 6 days, e.g., between 72 hours and 120 hours.

Prior aforementioned patents process has used intensive heating, such as microwave heating, to provide sufficient energy. Such process may have created a solid surface layer; however, it does not address the internal moisture issues and would result in total product structural failure after 40 to 48 months, in cross ties and structural applications, due to the surface-only veneer fixation from the microwave treatment.

The heat treatment described herein involves a slower drying at a lower temperature and longer duration to allow consistent, homogeneous drying of entire cross section of wood. Additionally, a heating schedule can include varying the rate of increase and decrease of the temperatures, with sharply increasing the temperature to the stabilized drying temperature and sharply decrease the temperature to achieve the desired moisture level target.

The addition of gaseous carbon dioxide after the impregnation enhances the wood modification process, by lowering the pH, through precipitation of the alkaline salt in the lumber, thus preventing excessive post impregnation leaching and product degradation. In conjunction with a second drying step (the first drying step is prior to impregnation to optimally condition the wood), this solidifies the alkali metal silicate in the pores of the modified wood.

Second Impregnation

Certain embodiments of this invention relate to a double impregnation process for modifying wood. For double impregnation process, after the first impregnation process (and related pre-impregnation and post-impregnation treatments), a second, shorter duration impregnation process can follow, e.g., before and/or after the carbon dioxide stabilization/fixation step.

All above descriptions relating to the impregnation step and various reaction conditions and pre-impregnation and post-impregnation treatments would apply to the first impregnation process (and related pre-impregnation and post-impregnation treatments) in these embodiments.

The second impregnation step is typically carried out with a second impregnating solution comprising an alkali metal (or alkaline earth metal) silicate at a concentration higher than the concentration of the first impregnating solution, for a period of time shorter than the first impregnation step. For instance, the first impregnating solution can contain an alkali metal (or alkaline earth metal) silicate at a concentration of about 5 to about 10% by wt., and the second impregnating solution can contain an alkali metal (or alkaline earth metal) silicate at a concentration of about 10 to about 15% by wt. For instance, the second impregnation step can be carried out for a period of about 10 to about 60 minutes, about 20 to about 60 minutes, or about 20 to about 30 minutes, with an alkali metal (or alkaline earth metal) silicate solution having about 10 to about 15% by wt. $SiO_2$). The second impregnation step can be carried out under a pressure of about 2 to about 12 bar (for instance, from about 6 to about 12 bar) and with an operating temperature of about 20 to about 70° C.

The purpose of this second impregnation step is to provide additional surface protection to the wood, including adding an additional fire protection barrier. As shown in Examples below, this optional second impregnation step can enhance the fire-retardant properties of the lumber, improve resistance to rot and termite attack, and, in some instances, also enhance strength properties. In particular, Example 2 illustrates that the double impregnation of lumber can result in Class "A" fire retardant properties—with significant improvement over conventional phosphate-based fire retardants.

In accordance with an embodiment of the invention, the parameters and processing conditions described above enable both a single and double impregnation processes providing both fire retardant and termite repellant protection properties to the modified lumber, as well as improved strength and decay resistance, with post impregnation drying processes.

An exemplary implementation of the treatment process is shown in FIG. 1, as described below:
1. Mixing of Sodium Silicate with make-up water in a blending tank.
2. Addition of a boron as a biocide to this blending tank—(optional).
3. Pumping of the mixture to the heating and agitation vessel—known as the working tank.
4. Transport of untreated lumber into impregnation vessel/autoclave.
5. Placing autoclave under vacuum.
6. Addition of liquid mixture from working tank.
7. Application of pressure to the autoclave.
8. Reduction of pressure and placing autoclave under vacuum.
9. If an optional second impregnation step is added that involves addition of a second, higher concentration of impregnating solution to the autoclave, it typically would be done after step 8. If an optional second impregnation step is not added, step 10 would follow step 8.
10. Addition of gaseous carbon dioxide into autoclave.
11. Removal of treated lumber from autoclave.
12. Addition of heat to treated lumber with a conventional sawmill kiln.

Alternatively, the optional second impregnation step can be added after step 10. If an optional second impregnation step is added, there can be an additional step of adding gaseous carbon dioxide into autoclave prior to step 9 as well.

Solution Preparation

Water and an aqueous alkali metal silicate, such as sodium silicate ($Na_2SO_3$), are fed into and mixed in a blending tank. Both the sodium silicate and make up water are pumped from separate storage tanks. The water is clean potable water.

Sodium silicate is made up of both sodium oxide ($Na_2O$), and silicon dioxide ($SiO_2$) which is purchased in a fixed ratio from the chemical supplier. This ratio can vary from 2.0 to 4.0. However, this ratio can be controlled to range from about 2.0 to about 3.5, or from about 2.5 to about 3.5.

The concentration of silicon dioxide in the mixture in the blending tank may be from about 5% to about 35% (by weight) for example. When impregnation solution is prepared for single impregnation, the concentration used typically ranges from 3% by wt. to 15% by wt., or about 3% by wt. to about 6% by wt.

Optional Addition of Biocide

An environmentally safe biocide (or an environmentally safe amount of biocide) is optionally added to the blend tank, to provide additional insect, bacterial, and/or fungal protection to the end product. The biocide may be boron or boron-containing compound, for example. A trace amount (less than about 1% by weight (of the mixture), or less than about 0.5% by wt.) may be added.

Pumping to Working Tank

The mixture containing $SiO_2$, water (and optionally a biocide) is then pumped to a working tank. This tank has an inserted heating element and agitation, which raises the temperature of the impregnation solution to the desired autoclave temperature (between about 20° C. and about 80° C.). The agitation ensures a homogeneous mixture and no stratification of the various chemicals.

Lumber Preparation

In one embodiment, lumber is selected for modification. In one example, the lumber is *radiata* pine. In another example, the lumber is southern yellow pine. The lumber may be in the form of lumber boards that are defect and knot free, for example. The lumber may be in other forms and other types of lumber may be used.

The lumber has been previously dried in a traditional sawmill kiln to a 19% moisture content or less (commonly known at KD19, or Kiln Dried 19%). The lumber may be dried to a moisture content of from about 12% to about 19%, for example.

The lumber is typically placed on pallets that are strapped and stabilized, before being moved into the autoclave.

Application of Vacuum to Autoclave

The strapped and bundled untreated lumber in the autoclave can then be placed under vacuum conditions for a period of approx. from about 20 minutes-60 minutes (depending on lumber charge or other factors). The purpose of the vacuum application is to remove any free water in the wood and prepare the pores of the wood for chemical impregnation.

The applied vacuum is 22" Hg (or −1.2 bar). This vacuum can be varied by 20% in either direction (depending on lumber charge or other factors).

Pumping of Liquid to Autoclave

Once the vacuum is released on the autoclave, the heated and homogenous liquid from the working tank is pumped into the autoclave. This vessel is filled to completion and totally encircles all the lumber.

Impregnation Process

The pressure in the impregnation pressure vessel may then be increased. The pressure may be increased to a pressure from about 4 bar to about 20 bar, for example. Impregnation of sodium silicate solution takes place with the liquid being forced by natural osmosis and applied pressure into the pores of the untreated lumber.

An impregnation time may be selected to allow the sodium silicate to enter the cell structure of the woody material. The impregnation time varies according to the dimensions for the lumber being treated. For conventional 2×4 lumber boards, decking and fencing material, and other smaller dimensioned lumber, for example, the impregnation time may be set to a time between about 45 minutes and 5 hours, for example, depending in part on the size of the lumber. In this example, the impregnation time is set to 1.5 hours. Larger lumber products, such as railroad ties and utility poles, for example, may be treated for longer periods of time of up to 10 hours (depending on lumber charge or other factors).

When the impregnation completes, the pressure may be reduced. The residual sodium silicate solution is evacuated back to the working tank, via a liquid filtration system, for example, to prevent contamination of the working tank.

The working tank may then be topped by additional make up from the mixing tank, as required.

Post Impregnation Vacuum

Once the liquid is drained from the autoclave, a vacuum may be re-applied to the vessel. This is for a period of approx. from about 20 minutes-60 minutes (depending on lumber charge or other factors) and at 22" Hg (or −1.2 bar) plus or minus 20% (depending on lumber charge or other factors). The purpose of this second vacuum treatment is to remove any surplus chemical from the surface of the lumber and prepare this lumber for the post-impregnation fixation process.

Carbon Dioxide Stabilization/Fixation

In one embodiment, after evacuation, gaseous carbon dioxide ($CO_2$) is compressed into the impregnation vessel under pressure from a carbon dioxide supply tank. The carbon dioxide may be maintained at a pressure of from about 2 to about 12 bar, from about 6 to about 12 bar, or from about 2 to about 7 bar, for example. The pressure may be maintained for a period of from about 15 to about 45 minutes during which the carbon dioxide fixation takes place. This fixation process causes the liquid in the lumber to precipitate into a gel solution, thus preventing future leaching and enhancing the various treatments. The carbon dioxide can lower the pH of the impregnated wood from about 11 after impregnation to about 9. This can enable the silica dioxide to better adhere to the cell walls of the lumber during impregnation, avoiding leakage out of the lumber.

The carbon dioxide can react with water to form carbonic acid ($H_2CO_3$), which is a mild acid. The carbonic acid further reacts with the sodium silicate, yielding silicon dioxide ($SiO_2$) and sodium carbonate ($Na_2CO_3$). Sodium bicarbonate ($NaHCO_3$) may also be produced but due to the moderately acidic environment the formation of sodium carbonate is more likely.

The better adherence of the silicon dioxide to the wood may be due to polymerization of the sodium silicate, resulting from a phase change from a liquid to an amorphous structure. This solidification process may not be reversible.

The majority of the carbon dioxide in this step is sequestered in the lumber and the remaining carbon dioxide, if any, may then be recycled or reused, when safely evacuated from the vessel and the pressure reduced to atmospheric pressure. This method is consistent with the all-green environmentally friendly process.

Optional Second Impregnation

After the first impregnation steps are completed, the lumber is then exposed, optionally, to a second impregnation phase, where a higher concentration impregnating solution (i.e., higher than the concentration of the impregnating solution in the first impregnation step) is pumped into the autoclave and held under pressure for a time between 20 and 60 minutes, at a pressure of between 2 and 12 bar and at a temperature of between 20 and 70° C. This higher concentration solution (e.g., between about 10 and about 15% by wt. $SiO_2$) can be prepared in a second blending tank and then pumped to one of the working tanks, or sequenced through the original blending tank. Deliberate control of the time between first and second and systematic elimination of other environmental impacts on the lumber between treatments is important to performance output as is the solution concentration of each impregnation. Then after the second impregnation steps are completed, the carbon dioxide stabilization/fixation steps are completed. The carbon dioxide stabilization/fixation steps may also be done after the first impregnation step and before the second impregnation. The carbon dioxide stabilization/fixation steps may also be done both after the first impregnation step and before the second impregnation, and after the second impregnation step.

Removal of Lumber from Autoclave

The seal on the impregnation vessel can then be broken and the lumber removed.

The stabilization may continue after the carbon dioxide is sequestered and remaining portions recycled after its been evacuated. Solidification can continue to take place over the next 24 to 48 hours after evacuation. The lumber is therefore left on a drain table for 24-48 hours, to allow for completion of solidification, as well as the drainage of any residual liquids off the wood to ensure that the lumber is free of any residual chemicals.

Heat Treatment

Once the lumber has been allowed to stabilize on the drip tray storage system, it is moved and placed into a conventional sawmill kiln. This lumber may then be heated at a temperature ranging from 50° C. to 100° C. (depending on environmental conditions and kiln design), for a period of 4 days (2 days-6 days depending on environmental conditions and kiln design) with a drying schedule that includes a range of parameters covering the time (days), temperatures and rate at which the operator will ramp up to the stabilized drying temperatures and ramp down while controlling for the optimal moisture level target. These conditions may vary according to the kiln design, lumber treated and the environmental conditions, with residence times from 2 days to 6 days and temperatures from 50° C. to 100° C.

The residual moisture in the treated and dried lumber is approx. KD19 (kiln dried 19% moisture) although other % moisture levels can be targeted when needed by varying the drying schedule and other kiln setting variables and commercial market requirements.

Strength Properties

During the all-green high-performance wood modified process described herein, the strength properties of the treated lumber are enhanced.

When compared to untreated or non-modified lumber, these mechanical and structural performance improvements increase significantly as measured by industry standard, for example, by ASTM D143-14, which are The Standard Test Methods for Small Clear Specimens of Timber.

In certain embodiments, included in these test methods are the following three tests, specifically, standard testing for Modulus of Elasticity (MOE), Modulus of Rupture (MOR) and Maximum Tensile Cleavage Load (Tensile). Example 3 below indicates that, unlike the traditional fire-retardant treatment processes (typically phosphate-based), which have been shown to typically reduce the strength properties of the wood (in terms of Tensile strength, MOR and MOE), wood modified according to the modification process described in the embodiments of this invention not only have not reduced the strength property but have actually stabilized and, in some cases, significantly improved, as compared against the untreated SYP control.

The modified wood product is not only stronger than non-sustainably treated fire retardant lumber, but also stronger than untreated lumber. For instance, MOE and MOR have been shown to be significantly improved—allowing construction sector to utilize less lumber for the same output as well as have new flexibility in design and less constraints to use FRT wood where strength is no longer viewed as compromised and in fact can be increased versus untreated lumber—a unique outcome for the inventors' process.

Non-sustainable treated FRT wood is by far the primary form of FRT wood utilized in U.S. construction applications today, including treated lumber and treated plywood. Reduction values quoted here are based on ANSI/AWC NDSI National Design Specification for Wood Construction (NDS). In the case of other sustainable modified wood products, the inventors believe the embodiments of the invention provides the only FRT wood using an alkali metal silicate combined with gaseous carbon dioxide wood modifications/treatment process that results in a product with a Class A rated FRT wood, and where such green wood modification process produces wood products that are also termite resistant (subterranean termites), rot resistant (fungal decay), and structurally superior to comparable unmodified/untreated wood.

Fire Retardancy

Embodiments of this invention also provided wood (or wood product) treated specifically for fire retardancy.

There currently is no all-wood, low price, fully environmentally sustainable Class A fire retardant industry-approved utility pole. However, the inventors have demonstrated, for instance, in Example 2 below, the Class A fire retardant performance of the wood modified by the process according to the embodiments of the invention, characterized by the E84 and E2768 tests, with successful burn data for both.

In addition to use in utility poles and railroad crossties, the modified wood product according to the embodiments of this invention can be used in various other applications, such as in construction lumber application, for instance, general dimensional building and other infrastructure construction lumber applications that can be low price, fully environmentally sustainable, as strong or stronger than untreated lumber, insect resistant to building standards, and a Class A fire retardant product or equivalent international standard.

The "all-in-One" Product and Inventory and Cost Reduction

This "all-in one" product, with all the critical high-performance characteristics, allows for the significant reduction in the required amount of on-hand inventory held by lumber dealers and retailers in the primary points of lumber distribution today, with estimates in certain cases (following in-depth interviews with leading lumber distributors and lumber yard owners and managers in multiple locations in the U.S., on customary lumber industry procurement and inventory stock procedures) resulting in a 50% reduction in required on-hand inventory. This is a major break-through product attribute of the all-green high-performance lumber product as compared to all its competitors. When the wood produced by the all-green modified pressure treatment process described here is compared to wood treated by industry standard processes, lumber dealers and lumber retailers selling standard products may have to hold up 2 times or 3 times the inventory investment (versus the invention's product) to cover the possible demand for FRT wood that has at least one other critical performance attribute, let alone two or three performance attributes, as is the case with the new invention.

Until the inventions' all-green high-performance wood, no existing competing commercialized sustainable wood modification technology, including acetylation (acetylation chemically modifies wood with a process where acetic anhydride reacts with the hydroxyl groups on large molecules such as lignin and hemicellulose in the plant cell wall), furfurylation, (wood impregnated with furfuryl alcohol ($C_5H_6O_2$) produced from a bio-based liquid) or thermally modified wood (thermal modification uses heat to remove organic compounds from the wood cells, so it will not absorb water, expand, contract, or provide nourishment for insects or fungi), has achieved a price competitive product that can compete directly with the widely used market leading non-sustainable FRT (fire retardant treated) wood products. Their pricing is typically 2-3× higher than FRT wood. While these processes are producing products exhibiting some of the improved performance such as better dimensional stability and decay resistance, none have achieved a Class A fire rating.

Sustainable Wood Production Facility Modification and Ongoing Process Optimization The treatment process described herein may also allow for re-use of an existing pressure treating facility (originally designed specifically to be used with non-sustainable chemical products) with minimal capital upgrades relative to its full replacement cost, to allow for treatment of lumber with alkali metal silicate solutions and pore impregnation stabilization using $CO_2$ and thermal treatment. This modification process may include re-piping and re-tooling of existing tanks, the addition of agitation and heating coils and cladding of key equipment items and the addition of a $CO_2$ gaseous feed system. Such a system may allow for a quick upgrade to the new all-green wood system and a very rapid return on invested capital.

AI Implementation

Artificial intelligence and machine learning can be integrated into the facilities design. Some examples of high-impact use-cases are 1) modernizing and optimizing the lumber treatment process as it adapts to the unique profiles of the wood feedstock, production environment, geographic location and weather conditions at the time of production, 2) forecasting and macro-variable modelling such as feedstock prices and housing or infrastructure product demand, 3) pricing and competitive intelligence, 4) supply-chain optimization including lumber and other input chemicals and resources, 5) renewable energy sources used in the manufacturing, 6) back office automation, and 7) predictive maintenance. Adjusting these variables can have a significant impact on metrics such as yield and quality and overall costs. This is consistent with the inventors' position that the experiments have identified the important parameters for all of the key invention materials and for the processes to modify the wood to achieve the high-performance characteristics. These variables can continue to be further improved using large data sets while applying the core theories and science developed by the inventors as outlined above and in the below examples.

EXAMPLES

The following examples are for illustrative purposes only and are not intended to limit, in any way, the scope of the present invention.

Example 1. An Exemplary Process for Modifying Wood Samples

Preparation of Wood Samples.

Radiata pine lumber was purchased from SODIMAC S.A, Chile, in the Concepcion area. All the selected timbers were physically alike. The timber was cut into samples of 7.5 mm×4.5 mm×2.5 mm and air dried at 50° C. for 48 hours in a laboratory kiln. The samples were then stored in an air-conditioned room at 65% humidity and 25° C. The weights of 5 randomly selected samples were constantly monitored until a constant weight was reached. The weight of the samples remained approximately constant after 25 hours. Hence, it can be safely established that the samples reach equilibrium humidity from about 25 to about 48 hours in the air conditioned room.

Preparation of Wood Samples for Impregnation and the Impregnation Process.

After the samples were prepared and stored in the air-conditioned room, two types of samples were selected for the impregnation process. The first type of samples had the growth rings perpendicular to the impregnation direction ("Radial samples"), and the second type of samples had the growth rings parallel to the impregnation direction ("Longitudinal samples").

The samples were coated with epoxy resin on the four larger faces to prevent impregnation via those faces, and the samples were cured for 18 hours in the air-conditioned room at 25° C. The impregnation faces were not contaminated by epoxy resin or any other waxy substances that could hinder the process. An extremely thin slice was cut from both of the impregnation faces at the ends of the sample before the impregnation process to make sure there was no epoxy in them. Then two radial samples and two longitudinal samples were loaded in the impregnation reactor. The samples were positioned in the impregnation vessel so that the impregnating faces were not blocked by the walls or faces of the other sample. The impregnation reactor was a batch reactor with a capacity of 800 ml. The lid of the reactor has two openings, one for the entry of vacuum and the other for the fluids, nitrogen and sodium silicate solution in our case.

A vacuum was applied for 15 minutes, to remove air inside the reactor and from the sample pores. Then, 600 ml of a predetermined concentration of sodium silicate solution was injected inside the reactor. Subsequently, the pressure inside the reactor was raised to 12 bars using gaseous nitrogen, (except for the cases where the effect of pressure during the impregnation process was studied). Immediately after the pressure was raised, the temperature of the reactor was raised to a desired value and the reactor was left for a predetermined time for the impregnation process to occur.

Determination of Solid Percentage in the Sodium Silicate Solution.

The 38° Baume ("Be") sodium silicate solution was provided by QUIPASUR S.A. in Chile. To determine the percentage solids present in the sodium silicate solution, 5 samples of approximately 1 g of sodium silicate solution were taken in different watch glasses. The glasses were then kept at 105° C. for 24 hours in a stove and then cooled down in a desiccator for 1 hour. Then weights of the glasses were taken to verify any change in weight. The glasses were again placed in the stove at 105° C. for two hours. The average solid percentage in the sodium silicate solution was found to be 41.81%.

Quantitative Determination of $SiO_2$ in Sodium Silicate Solution.

The silicon dioxide percentage in the original sodium silicate solution that was used during the experiments was determined. The specific gravity of sodium silicate solution provided by QUIPASUR S.A. is 38° Be and the range of the ratio of $SiO_2/Na_2O$ was 3.2-3.5. To determine the amount of $SiO_2$ in this solution, the procedure described in the instruction manual "Determination of sodium silicate in the impregnated wood" was followed. In accordance with this procedure, about 1 g of sodium silicate solution from the solution provided by QUIPASUR S.A. was taken in a round bottom flask. Subsequently, 40 ml of sulfuric acid and 30 ml of nitric acid were added. The sodium silicate solution tends to crystallize instantly following contact with an acid solution. A glass rod was used to crush the crystal fine apart and the system was subjected to reflux heating for 45 minutes at 80° C. The round bottom flask was then cooled, and the solution was diluted 10 times its volume with distilled water. The solution was then filtered. The residue in the filter was filter-washed with 500 ml of distilled water. After filtration, residue was dried for 12 hours at 105° C. This was then cooled in a desiccator and weighed. The difference gives the amount of silicon dioxide in the sodium silicate solution. This operation was repeated six times. The results are shown in Table 1, below. The average amount of silicon dioxide in sodium silicate solution provided by QUIPASUR S.A. as determined by the procedure described above was 32.6±0.21% grams with a standard deviation of 0.51%.

TABLE 1

| No. | Mass of sodium silicate solution (g) | Initial weight (g) | Final weight (g) | Mass of $SiO_2$ (g) | Percentage (%) |
|---|---|---|---|---|---|
| 1. | 1.0465 | 39.2438 | 39.5881 | 0.3443 | 32.9 |
| 2. | 1.0656 | 50.5876 | 50.9319 | 0.3443 | 32.3 |
| 3. | 1.0371 | 50.1929 | 50.5215 | 0.3289 | 31.7 |
| 4. | 1.0931 | 39.4123 | 39.7719 | 0.3596 | 32.9 |
| 5. | 1.0483 | 53.2151 | 53.5613 | 0.3462 | 33.0 |
| 6. | 1.1034 | 46.1556 | 46.8770 | 0.3627 | 32.9 |

Determination of Percentage of Residual Solid after Digestion of Wood with Acid Digestion.

Digestion in an acid medium was used to determine the silicon dioxide content in the impregnated wood samples. Wood contains inorganic materials that are not soluble in acid mixture used during the digestion. The residual inorganic substances may interfere in the percentage of silicon dioxide determined using this procedure. The contribution of the residual inorganic substances from the wood during the acid digestion of the impregnated wood samples with sodium silicate was therefore quantified. To determine the amount of solid residue contributed by radiata pine wood after digestion by an acid solution, the same procedure as described in the instruction manual "Determination of sodium silicate in the impregnated wood" was followed.

Approximately, 1 g of dry wood dried at 105° C. for 12 hours was taken in a round bottom flask. Subsequently, 80 ml of sulfuric acid and 60 ml of nitric acid were added and the system was subjected to reflux heating for 45 minutes at 80° C. The round bottom flask was then cooled, and the solution was diluted 10 times its volume with distilled water. The solution was then filtered whose weight was previously determined. The residue was filter-washed with 500 ml of distilled water. After filtration, the residue was dried for 12 hours at 105° C. This was then cooled down in a desiccator and weighed. The difference in the weight gives the amount of solids remained after digestion of the *radiata* pine wood. This operation was repeated six times, the results of which are shown in Table 2, below:

TABLE 2

| # | Mass of dry wood (g) | Initial weight (g) | Final weight (g) | Mass of SiO2 (g) | Percentage (%) |
|---|---|---|---|---|---|
| 1. | 1.1470 | 39.2463 | 39.2464 | 0.0001 | 0.009 |
| 2. | 1.4284 | 50.5904 | 50.5905 | 0.0001 | 0.002 |
| 3. | 1.0621 | 50.1962 | 50.1963 | 0.0001 | 0.009 |
| 4. | 1.0817 | 39.4166 | 39.4166 | 0.0000 | 0.000 |
| 5. | 1.2825 | 53.2127 | 53.2128 | 0.0002 | 0.015 |
| 6. | 1.1143 | 46.1571 | 46.1572 | 0.0001 | 0.009 |

The results indicate that the percentage contribution of the solid residue of the *radiata* pine wood after acid digestion is relatively small. Hence, this amount can be discarded in the final residue calculation after the digestion of the sodium silicate impregnated *radiata* pine wood.

Effect of the Concentration of $SiO_2$ in the Impregnating Liquor of Sodium Silicate.

To explore the effect of the concentration of sodium silicate in the mixture in the impregnation of sodium silicate in *radiata* pine wood, a set of experiments were conducted under the following conditions.

TABLE 3

| Temperature (° C.) | 80 |
|---|---|
| Pressure (bar) | 11 |
| Ratio of SiO2/Na2O | 3.2 |
| Time (hours) | 3 |
| Concentration of Sodium silicate (%) | 5, 10, 15, 20, 25, 30 |

Figure 2:
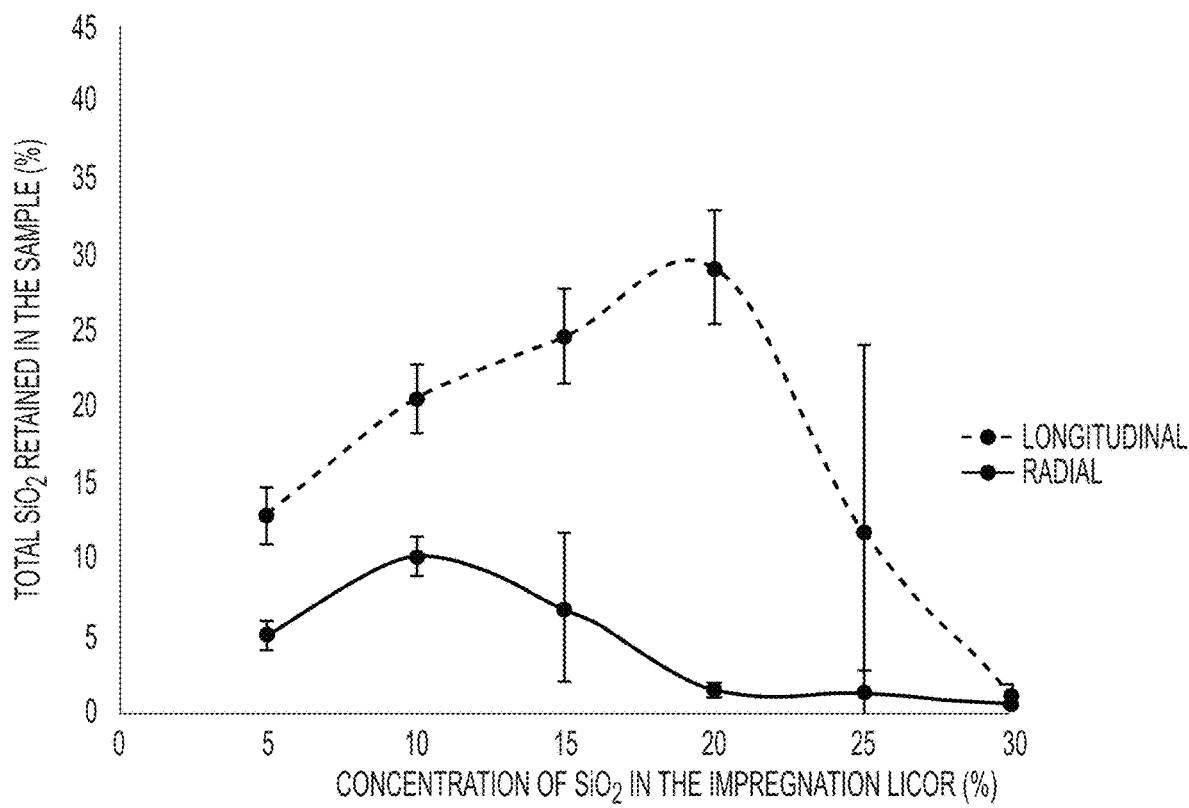
FIG. 2 shows the effect of silicon dioxide concentration on total silicon dioxide (%) retained in the impregnated wood sample, after drying the samples at 105° C. for 20 hours at each concentration.

The samples were impregnated according to the procedures described in instruction manual "Impregnation of sodium silicate in pine wood" and then weighed and dried at 105° C. for 20 hours to assure the absence of moisture in the impregnated samples. The completely dried samples were then weighed and the increase in the total mass was monitored. FIG. 2 shows the effect of silicon dioxide concentration on total silicon dioxide (%) retained in the sample, after drying the samples at 105° C. for 20 hours at each concentration.

As shown in FIG. 2, for wood samples impregnated in the direction longitudinal to the wood rings, the weight of the impregnated wood samples gradually increases with increasing concentrations of silicon dioxide in the impregnation solution until the concentration reaches 20%, followed by an abrupt decrease. For wood samples impregnated in the direction radial to the wood rings, the weight of the impregnated wood samples increases from silicon dioxide concentrations of 5% to 10%, followed by a gradual decrease. The decreases may be due to reaching a critical viscosity and/or a critical particle size of sodium silicate with increase in concentration that may negatively affect its impregnation in the *radiata* pine wood matrix. This experiment supports the "less is more" principal of the invention relating to the solution concentration of sodium silicate and the importance of using the appropriate solution concentration for given wood conditions.

Subsequently, the silicon dioxide concentration in the impregnated wood samples was determined using gravimetric analysis by acid digestion. The results of the average values of the retained silicon dioxide at different lengths along the impregnation direction indicates that the retained percentage of $SiO_2$, shown in FIG. 3, in the wood matrix approximately follows the same trend as that of the increase in mass of the impregnated samples shown in FIG. 2.

Figure 3:
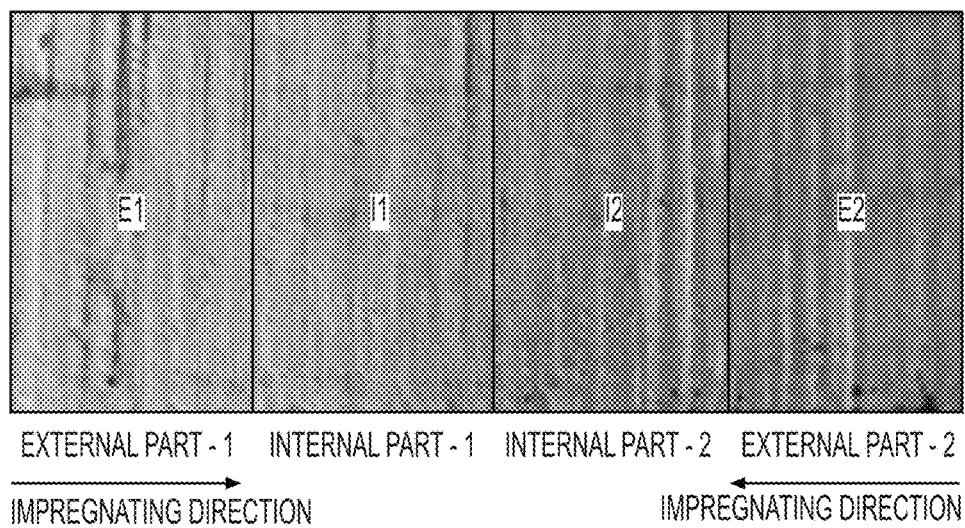
FIG. 3 shows the impregnated wood samples cut into 4 equal parts.

To explore the homogeneity of the impregnation process, the concentration of $SiO_2$ (%) within the impregnated samples was determined. For this purpose, the impregnated samples were cut into 4 equal parts as shown in FIG. 3, and the silicon dioxide concentration was determined by acid digestion through gravimetric method.

The results obtained indicated that the least difference in the average retained values of silicon dioxide among the external (E1 and E2) and internal parts (I1 and I2) lies in the $SiO_2$ liquor concentration between 10 and 15%, which suggests that the most homogenous distribution of the impregnating solution occurs somewhere between 10%-15% liquor $SiO_2$ concentration.

Effect of Reaction Time in the Impregnation of Sodium Silicate in *Radiata* Pine Wood Matrix.

To explore the effect of the reaction time in impregnation of sodium silicate in radiate pine wood, a set of experiments was conducted under the following conditions.

TABLE 4

| Temperature (° C.) | 80 |
|---|---|
| Pressure (bar) | 11 |
| Ratio of SiO₂/Na₂O | 3.2 |
| Time (hours) | 1, 2, 3, 4 |
| Concentration of Sodium silicate (%) | 10 |

Figure 4:
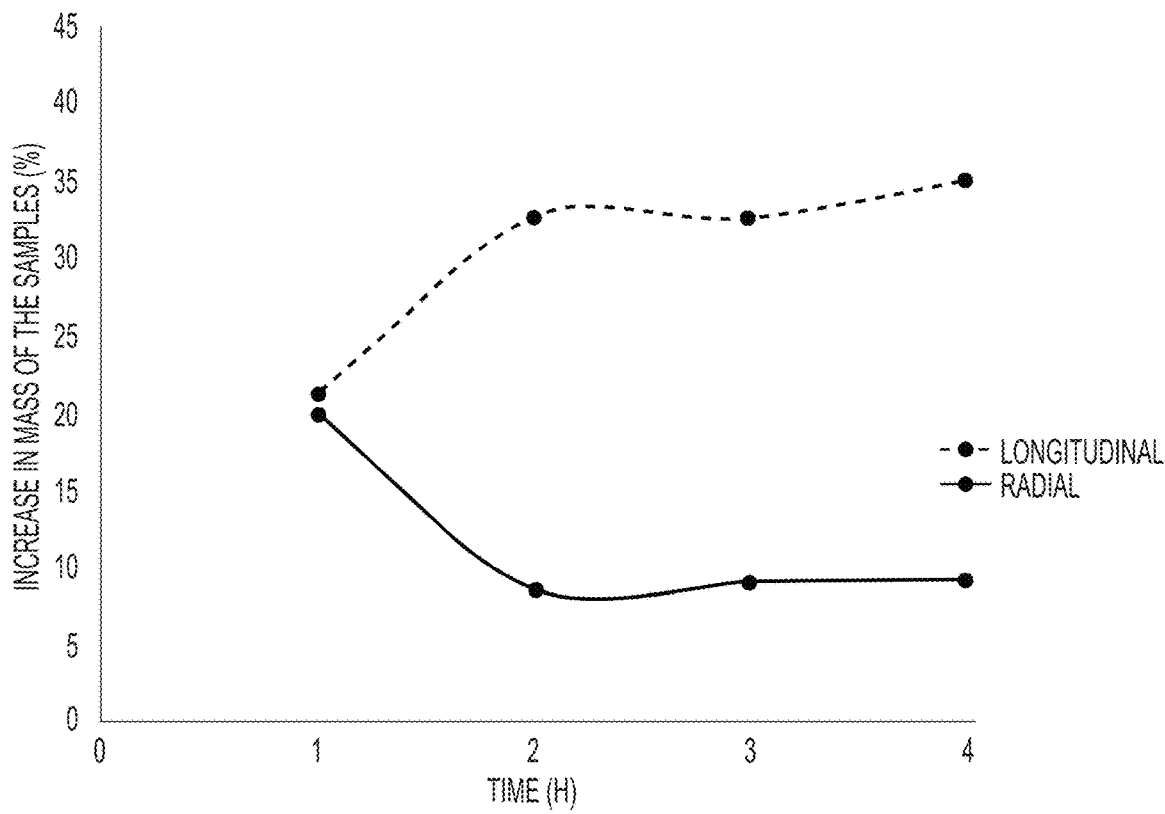
FIG. 4 shows the weight increase of the impregnated wood samples.

The completely dried samples obtained after impregnation and subsequent drying process at 10° C. for 20 hours were weighed and the increase in the total mass was monitored. The increase in weight of the impregnated wood samples are shown in FIG. 4. The upper solid line in FIG. 4 indicates the increase in mass percent in the wood for impregnation with the growth ring in longitudinal direction and the lower line indicates the mass increase for impregnation with the growth ring in the radial direction.

This suggests that good results were obtained for samples impregnated in the radial and longitudinal directions for time periods in the interval between 2 and 4 hours or more. In one example, the impregnation time was 3 hours, for example.

Figure 5:
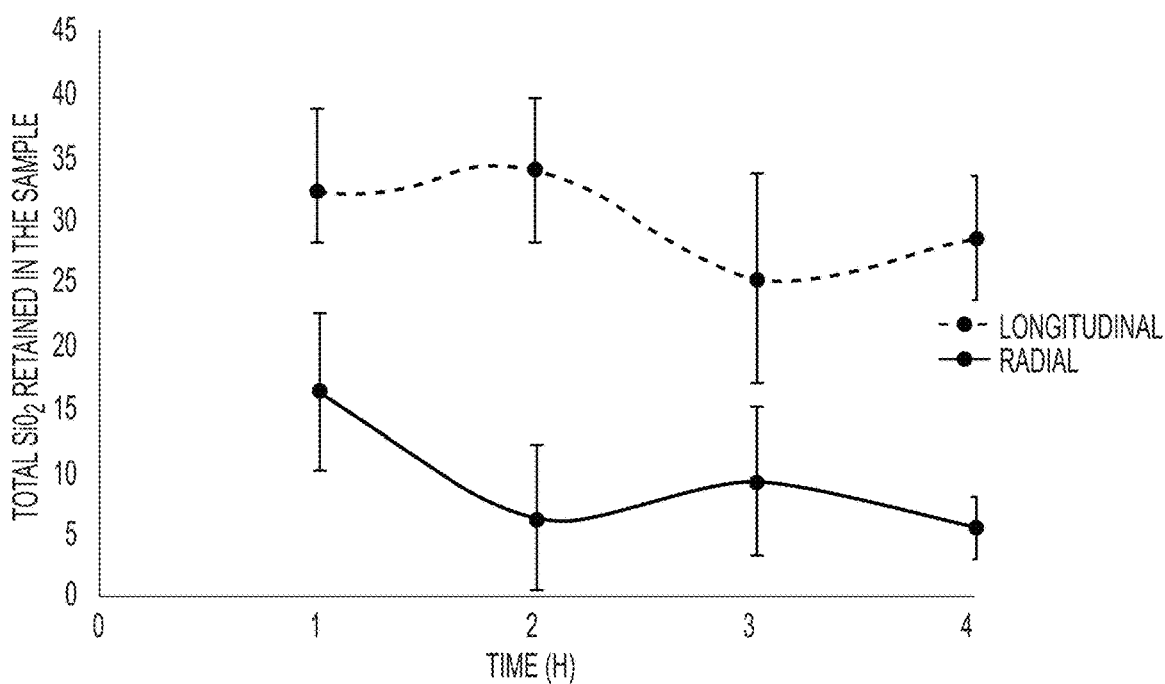
FIG. 5 shows the increase in total silicon dioxide content of the impregnated wood after drying the samples at 105° C. for 20 hours.

FIG. 5 shows the increase in total silicon dioxide content of the impregnated wood after drying the samples at 105° C. for 20 hours. The error bars are the dispersion (standard deviation) observed in the silicon oxide along the length of the impregnated sample. The average silicon dioxide retained in the impregnated samples was determined using a wet gravimetric method with acid digestion. The results indicate that the silicon dioxide content impregnated in the wood samples remains nearly constant within the error bars after the impregnation period of 2 hours.

The homogeneity of silicon dioxide impregnation in the impregnated wooden matrix was also determined using the same methodology as described above with respect to FIG. 4. The results indicated that there was not much difference in the concentration of $SiO_2$ along the length of the impregnated samples among those samples impregnated for 2, 3 and 4 hours, while above 2 hours is preferred.

Effect of Temperature in the Impregnation of Sodium Silicate in *Radiata* Pine Wood Matrix.

Wood samples were impregnated with the growth rings radial to the impregnation direction under the set of conditions shown in Table 5, below, to determine the effect of temperature on impregnation. Other conditions were kept constant. Tests were performed at temperatures of 20° C., 60° C., 80° C., and 100° C.

TABLE 5

| | |
|---|---|
| Temperature (° C.) | 20, 60, 80, 100 |
| Pressure (bar) | 11 |
| Ratio of $SiO_2/Na_2O$ | 3.2 |
| Time (hours) | 3 |
| Concentration of Sodium Silicate (%) | 10, 15, 20 |

Figure 6A:
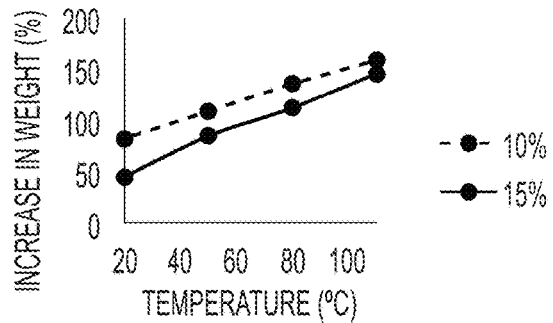
FIG. 6A shows the retention of the impregnating solution in weight (%) at 10% and 15% silicon dioxide content in the impregnation solution.
Figure 6B:
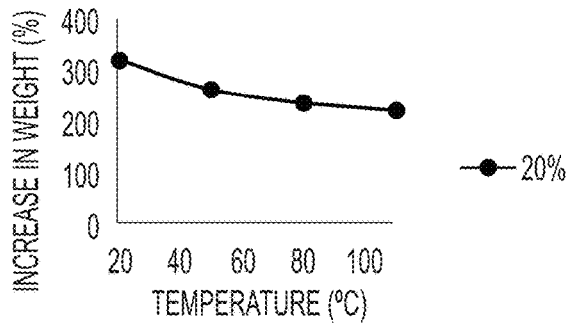
FIG. 6B shows the retention of the impregnating solution at the 20% silicone dioxide content in the impregnation solution.

The results in FIG. 6A show a higher retention of impregnating solution in weight (%) with increasing the impregnating temperature at the 10% and 15% silicon dioxide content in the impregnation solution. The retention decreased with increasing the impregnating temperature at the 20% silicone dioxide content in the impregnation solution, as shown in FIG. 6B. At higher concentrations and temperatures, it was observed that the sodium silicate solution tends to form thin silicate films on the wood samples, commonly known as efflorescence. The decrease in retention of impregnating solution at the 20% silicon dioxide content at a higher temperature may, therefore, be due to the deposition of silicate particles on the impregnating face of wood samples.

Additional tests were performed at 5% silicon dioxide concentrations, with the weight pick up close to the 10% values listed above.

Figure 7A:
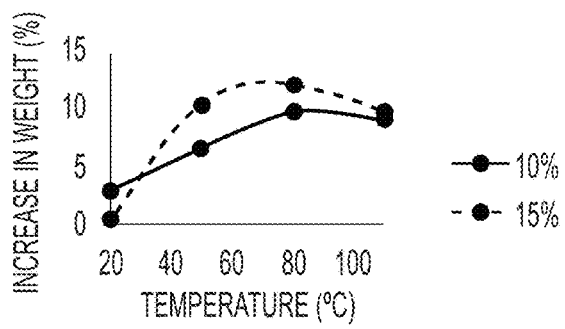
FIG. 7A shows the retention of the impregnating solution in weight (%) at 10% and 15% silicon dioxide content in the impregnation solution, after the wood samples were dried at 105° C. for 18 hours.
Figure 7B:
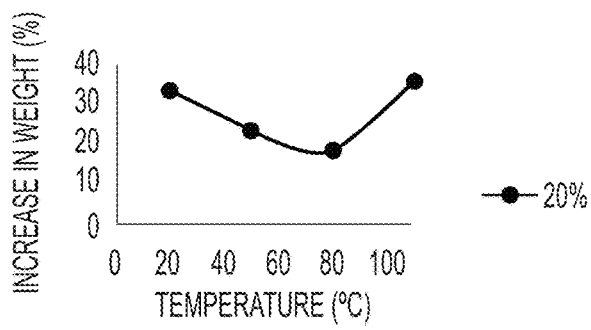
FIG. 7B shows the retention of the impregnating solution at the 20% silicone dioxide content in the impregnation solution, after the wood samples were dried at 105° C. for 18 hours.

The wood samples were then dried at 105° C. for 18 hours. The increase in the dry weight of the wood samples that were impregnated with sodium silicate at the 10% and 15% silicon dioxide content in the impregnation solution at 20° C., 40° C., 60° C., 80° C., 100° C. are shown in FIGS. 7A-7B. Although the retention tendency of impregnating solution in the wood samples seems linear with the impregnating temperature, the increase in dry weight, and hence the retention of $SiO_2$ does not follow a similar tendency. For the 10% and 15% silicon dioxide mixtures, the increase in dry weight seems to reach a plateau at a temperature after 50° C. and decreases at higher temperatures, as shown in FIG. 7A. This may be due to a tendency of the wood samples to delignify at higher temperatures and pH (approx. 11.5 to 12) used in this study. The increase in weight (%) of the wood sample at the 20% silicon dioxide, in contrast, decreases from 20° C. to 80° C. and then increases at from 80° C. to 100° C., as shown in FIG. 7B.

The dried wood samples at 105° C. for 18 hours were subjected to acid digestion and the content of silicon dioxide was determined. Each of the wood samples were cut into 4 equal pieces including two internal parts and two external parts. The mass of silicon dioxide (%) along the wood samples determined after acid digestion is showed in FIG. 8A and FIG. 8B, for 10% sodium silicate in FIG. 8A and 15% sodium silicate in FIG. 8B.

Although the silicon dioxide content was not homogenous in all the impregnations, the silicon dioxide content and the standard deviation of the silicon dioxide content along the wood sample were calculated.

Figure 8A:
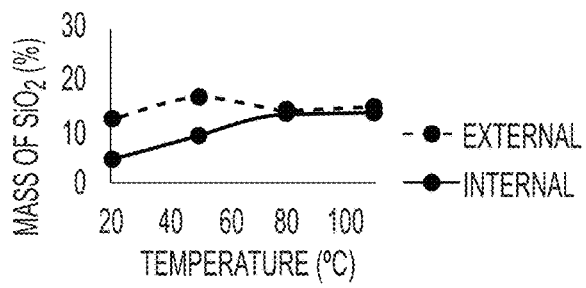
FIG. 8A and FIG. 8B show the mass of silicon dioxide (%) along the wood samples determined after acid digestion, for 10% sodium silicate (FIG. 8A) and 15% sodium silicate (FIG. 8B).
Figure 8B:
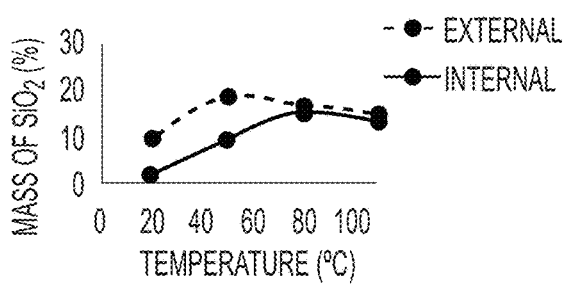

FIG. 8A and FIG. 8B show that the silicon dioxide content in the wood samples follow the same tendency as that of the increase in dry weight shown in FIG. 7A and FIG. 7B, however, there exists greater inhomogeneity of silicon dioxide inside the wooden matrix which decreases with increase in temperature.

Figure 9:
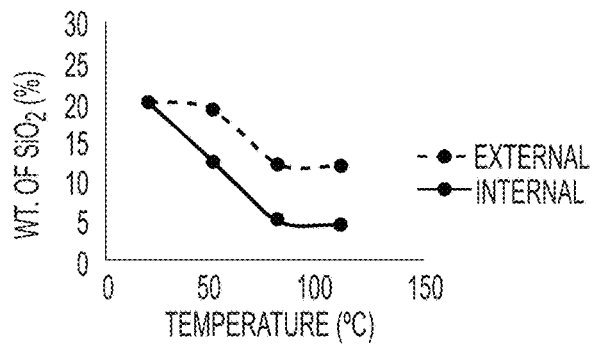
FIG. 9 shows the mass of silicon dioxide (%) along the wood samples determined after acid digestion, for 20% sodium silicate.

The 20% silicon dioxide solution, however, shows the opposite tendency, as shown in FIG. 9, which shows the weight percent of silicon dioxide retained in the impregnated wood samples at different temperatures and at the 20% silicon dioxide concentration of the impregnating solution. The impregnation may be hindered due to the deposition of silicate particles on the impregnating face of the wood sample.

Figure 10A:
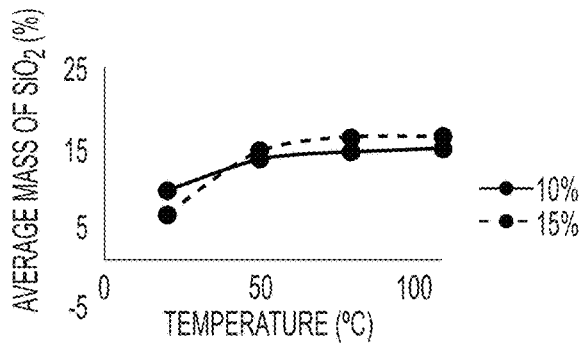
FIG. 10A and FIG. 10B show the average mass retained in the impregnated wood samples for 10% and 15% sodium silicate (FIG. 10A) and for 20% sodium silicate (FIG. 10B) in the impregnation solution.
Figure 10B:
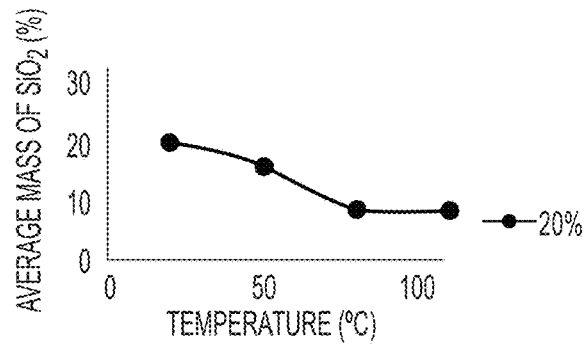

The average mass retained in the impregnated wood samples for the 10%, 15%, and 20% sodium silicate content in the impregnation solution are shown in FIG. 10A and FIG. 10B. FIG. 10A shows that for the lower concentrations of silicon dioxide in the impregnating solution (10% and 15%), the average mass of silicon dioxide retained in the impregnated wood remains approximately constant at temperatures above 50° C., while that for the 20% solution decreases with temperature, as shown in FIG. 10B. These experiments confirm the importance of controlling the temperature settings for the sodium silicate solution depending on the sodium silicate concentration being used and the specific ranges need to achieve the modified wood performance results.

Effect of Pressure in the Impregnation of Sodium Silicate in *Radiata* Pine Wood Matrix.

To illustrate the effect of pressure in the impregnation of sodium silicate inside the *radiata* pine wood, wood samples were impregnated with growth rings radial to the impregnation direction, at different external pressures. All the other experimental conditions were kept constant. The experiments were conducted under the set of conditions shown in Table 6:

TABLE 6

| | |
|---|---|
| Temperature (° C.) | 20 |
| Pressure (bar) | 0.5, 10, 15, 20 |
| Ratio of $SiO_2/Na_2O$ | 3.2 |
| Time (hours) | 3 |
| Concentration of Sodium silicate (%) | 15 |

Figure 11:
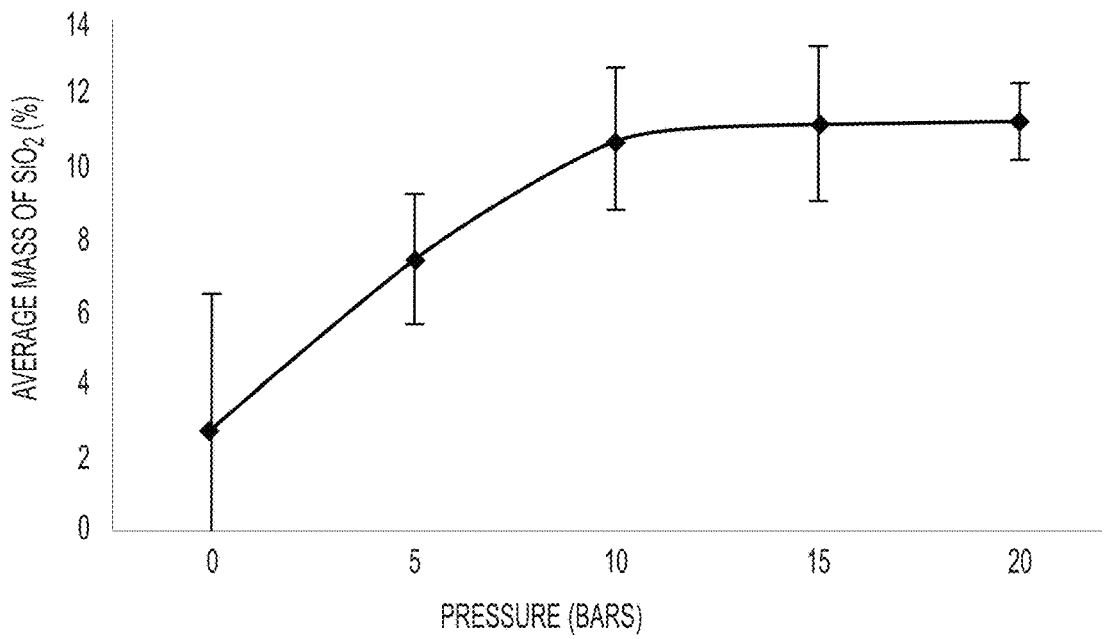
FIG. 11 shows the average retained masses of the silicon dioxide inside the *radiata* pine wood samples after impregnation at 15% concentration of silicon dioxide at 20° C., at pressures of 0.5 bars, 10 bars, 15 bars, and 20 bars.

FIG. 11 shows the average retained masses of the silicon dioxide inside the *radiata* pine wood samples after impregnation at 15% concentration of silicon dioxide at 20° C., and pressures of 0.5 bars, 10 bars, 15 bars, and 20 bars. The error bars indicate the inhomogeneity of silicon dioxide mass percentage inside the wooden matrix.

The results indicate that the retained mass of silicon dioxide increases linearly until 10 bars, after which it levels out and becomes pressure independent. This may be due to the existence of a threshold pressure beyond which the pores in the wood exert minimum resistance to the fluid flow inside the wood sample and hence, approximately the same amount of silicon dioxide gets deposited. The most silicon dioxide was retained in the interval between about 10 bars and about 20 bars. In one example, 15 bars is used.

Effect of the Ratio of $SiO_2/Na_2O$ in the Impregnation of Sodium Silicate in *Radiata* Pine Wood Matrix.

The effect of the weight ratio of silicon dioxide to sodium oxide ($Na_2O$) was also determined. The ratio of $Na_2O$ and $SiO_2$ in the impregnating solutions were adjusted according to the instruction manual "Preparation of impregnating solution of sodium silicate." All the experimental conditions but the ratio of $SiO_2/Na_2O$ and the concentration of the impregnating solution was kept constant. The experiments were conducted under the set of conditions shown in Table 7:

TABLE 7

| | |
|---|---|
| Temperature (° C.) | 20 |
| Pressure (bar) | 12 |
| Ratio of $SiO_2/Na_2O$ | 2.85, 2.55, 2.25, 1.95 |
| Time (hours) | 3 |
| Concentration of Sodium silicate (%) | 10, 15 |

The impregnated samples were kiln dried at 105° C. for 20 hours and the increase in mass of the dried impregnated samples was noted. The results indicate that the change in mass percent of the samples decreases with a decrease in the ratio $SiO_2/Na_2O$. Without limiting the invention, this may be due to an increase in the pH of the impregnating solution due to the increased amount of sodium oxide, resulting in agglomeration and polymerization of the silicon dioxide.

Figure 12A:
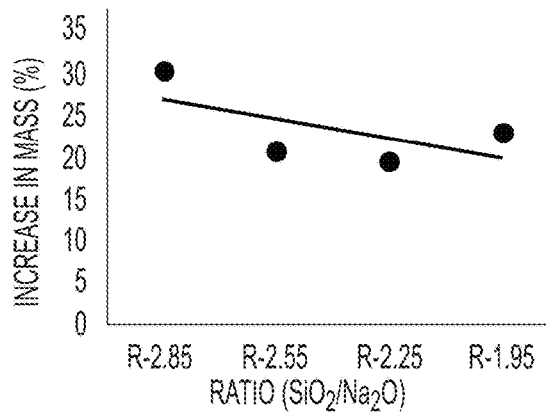
FIG. 12A and FIG. 12B show the average values of the external and internal parts of the impregnated wood samples.
Figure 12B:
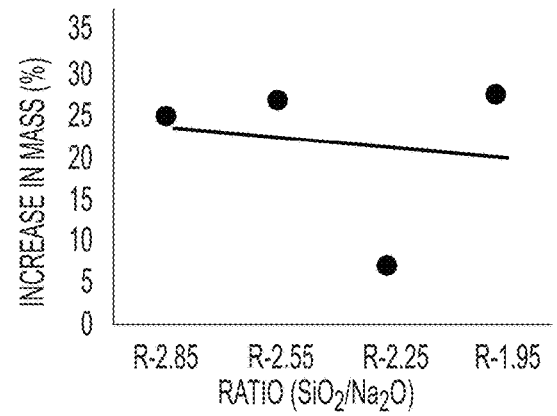

The stove dried wood samples at 105° C. for 20 hours were then subjected to acid digestion, as described above, and content of silicon dioxide was determined. Each of the wood samples were cut into 4 equal pieces and the external parts were named: E (E1 and E2) while the internal two parts were named as I (11 and 12). The average values of the external and internal parts of the samples are shown in FIG. 12A and FIG. 12B. FIG. 12A shows the increase in mass (%) of the wood samples impregnated with sodium silicate at 10% silicon dioxide and FIG. 12B shows the increase in increase in mass (%) of the wood samples impregnated with sodium silicate at 15% silicon dioxide. The red solid lines indicate the tendency of the mass percent to decrease with decreasing ratios of $SiO_2/Na_2O$.

Figure 13A:
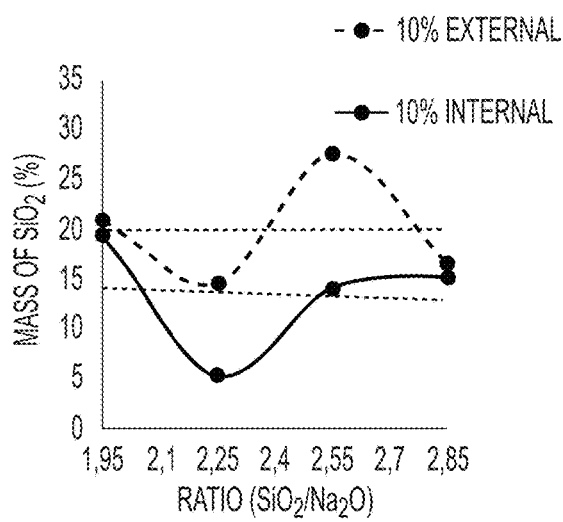
FIG. 13A and FIG. 13B show the average silicon dioxide retention values in the external and internal parts of the wood samples impregnated with 10% silicon dioxide, in FIG. 13A, and 15% silicon dioxide, in FIG. 13B.
Figure 13B:
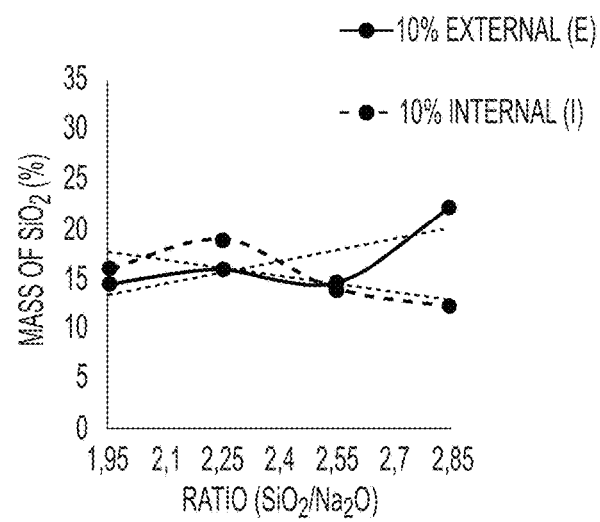

FIG. 13A and FIG. 13B show the average silicon dioxide retention values in the external and internal parts of the wood samples impregnated with the 10% silicon dioxide, in FIG. 13A, and the 15% silicon dioxide, in FIG. 13B. FIG. 13A and FIG. 13B indicate that the impregnation of the liquor was not homogenous in all the wood samples and shows high dispersions among the internal and external segments. However, it seems that the impregnation process is affected by the change in the ratio of $SiO_2/Na_2O$ for both concentrations of the impregnation solution (10% and 15% of $SiO_2$). The aforementioned experiments confirm the importance of controlling the pressure settings for the solution impregnation while also selecting the appropriate ratio of $SiO_2/Na_2O$ being used.

Fixation of $SiO_2$ Inside the Wood Samples Impregnated with Sodium Silicate Solution.

Multiple strategies were followed to study the fixing of silicon dioxide inside the impregnated wood samples via thermal and chemical methods (lowering pH). The durability of the wood when exposed to humid conditions is closely linked to the water solubility of the chemicals used. Sodium silicate is highly soluble in water, making it less attractive for outdoor applications with high humidity.

In a thermal treatment, bonded water is disassociated from the silicate salt and the number of bridging oxygen atoms are reduced, shifting the equilibrium of the silicon dioxide towards a less soluble form in water. Three different processes for the thermal treatment were studied: 1) thermal treatment with water vapor, 2) thermal treatment with hot air, and 3) thermal treatment with hot water. In 1) thermal treatment with water vapor, the samples impregnated with sodium silicate salt at 10% concentration were treated with saturated water vapor at three different temperatures, 50° C., 100° C., and 150° C. for 2 hours, and the samples were digested to determine the silicon dioxide content. In 2) thermal treatment with hot air, the impregnated samples were subjected to air heated at 50° C., 100° C., and 150° C. for 2 hours and further analyses were carried out. In 3) thermal treatment with hot water, the impregnated samples were reacted with water at 50° C., 100° C., and 150° C. for 2 hours and further analyses were conducted to determine the silica content in the treated samples.

Two different pH treatments were also studied: 1) gaseous carbon dioxide ($CO_2$) where the treated samples were subjected to three different pressure of carbon dioxide (3 bars, 6 bars, and 12 bars), and 2) water acidified with carbon dioxide, where the treated samples were submerged in water inside a reactor and the pressure of the reactor was raised to desired values for two hours at 3 bars, 6 bars, and 12 bars.

For all the treatments mentioned above, wood samples were impregnated with sodium silicate at:
Pressure (bars): 12
Impregnation time (hours): 3
Concentration of $SiO_2$: 10%
Ratio ($SiO_2/Na_2O$): 2.85
Temperature: 50° C.

Seventy-two samples were prepared in a 10-liter reactor conditioned for this purpose. The temperature in the reactor was controlled by saturated vapor that circulated through an external jacket around the reactor. The samples obtained from the impregnation of sodium silicate into the wood matrix were subjected to the thermal and pH treatments described above.

The treated samples were then subjected to acid digestion to determine the silica content.

To evaluate the fixing of $SiO_2$ inside the sodium silicate impregnated wood samples, leachability of sodium silicate was determined and silicon dioxide content was determined using acid digestion method before and after each leaching cycle.

Thermal Treatments

1. Samples Treated with Hot Air

The impregnated samples were subjected to air heated at 50° C., 100° C., and 150° C. for 2 hours and analyzed. The results of the decrease in weight percent of the samples with leaching time is shown in FIG. 14.

Figure 14:
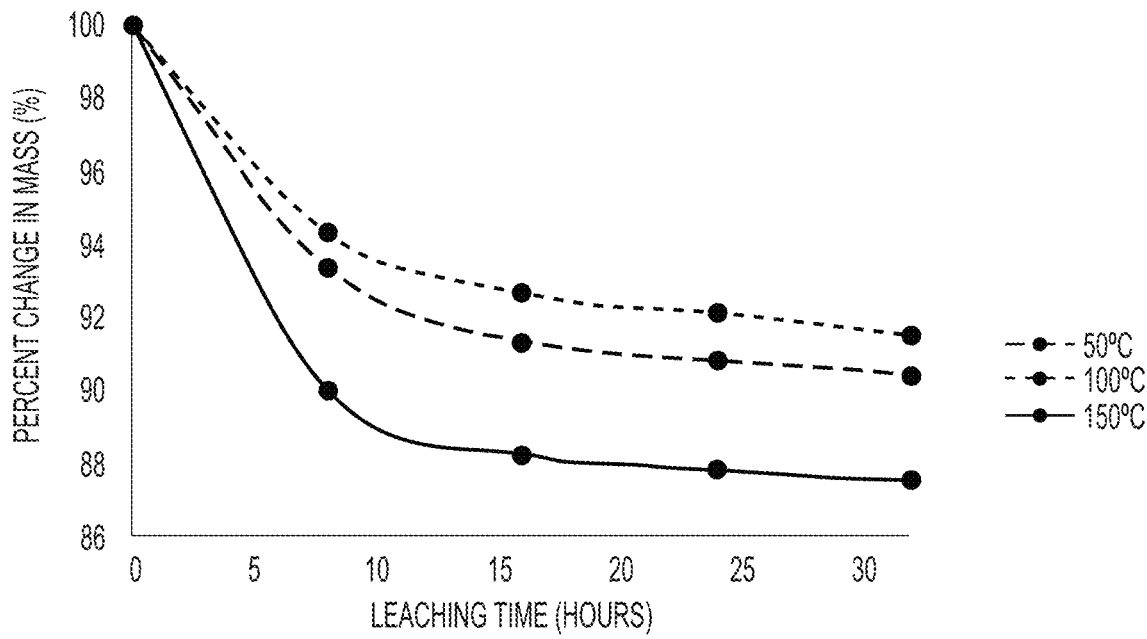
FIG. 14 shows the results of the decrease in weight percent of the impregnated wood samples with leaching time when the impregnated wood samples were subjected to air heated at 50° C., 100° C., and 150° C. for 2 hours.

In FIG. 14, the percent retention in mass decreases with increasing time. More mass was retained at 100° C. than at 50° C., suggesting that mass retention is better at higher temperatures. At 150° C., however, less mass was retained.

It was observed that the samples released colored substances during the leaching process, which could have been due to the leaching of lignins and/or hemicelluloses, along with silicon dioxide and sodium hydroxide, resulting in the higher loss of mass. It can therefore be concluded that at the lower temperatures (50° C. and 100° C.), the loss of lignin and hemicelluloses is not significant.

Figure 15:
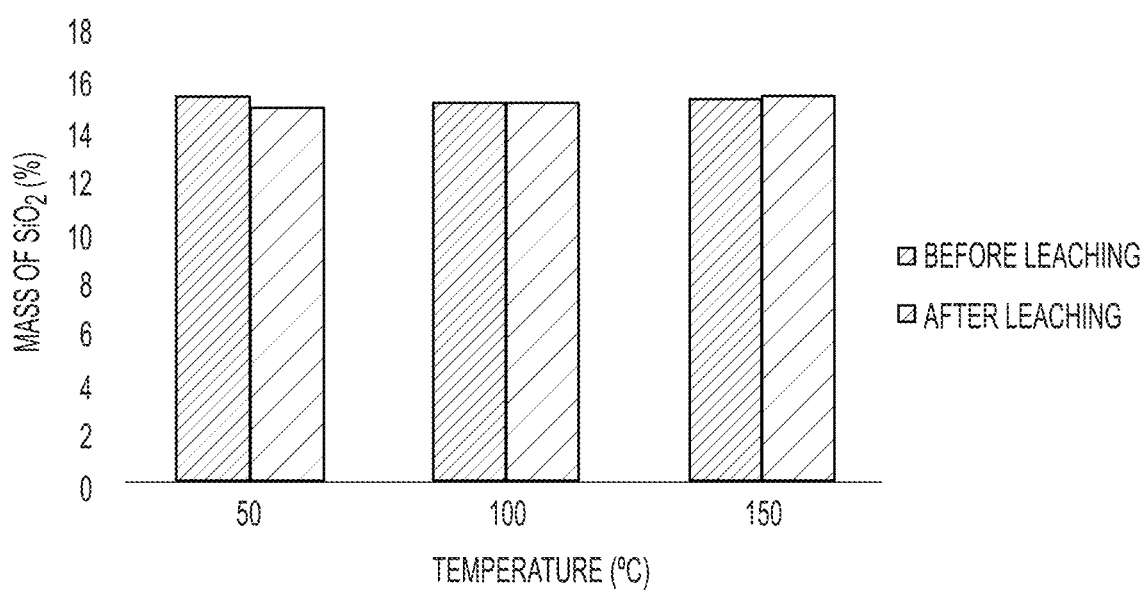
FIG. 15 shows the mass percent of silicon dioxide ($SiO_2$) in the impregnated wood samples before and after the leaching tests of the samples treated with dry air at different temperatures.

To determine the amount of sodium silicate leached during the experiments, the silicon dioxide content in the samples was determined using acid digestion method before and after the leaching trials, as discussed above. The mass percent of silicon dioxide ($SiO_2$) in the impregnated wood samples before (blue bars) and after (orange bars) the leaching tests of the samples treated with dry air at different temperatures is shown in FIG. 15. The mass percentages of $SiO_2$ did not vary significantly. This also indicates that the loss in the mass of the samples observed during the leaching process is not due to silicon dioxide, but may be due to the loss of lignin, hemicelluloses, and sodium hydroxide (NaOH), which are formed as the result of reaction between water and sodium oxide ($Na_2O$) present in sodium silicate.

2. Samples Treated with Hot Water

Figure 16:
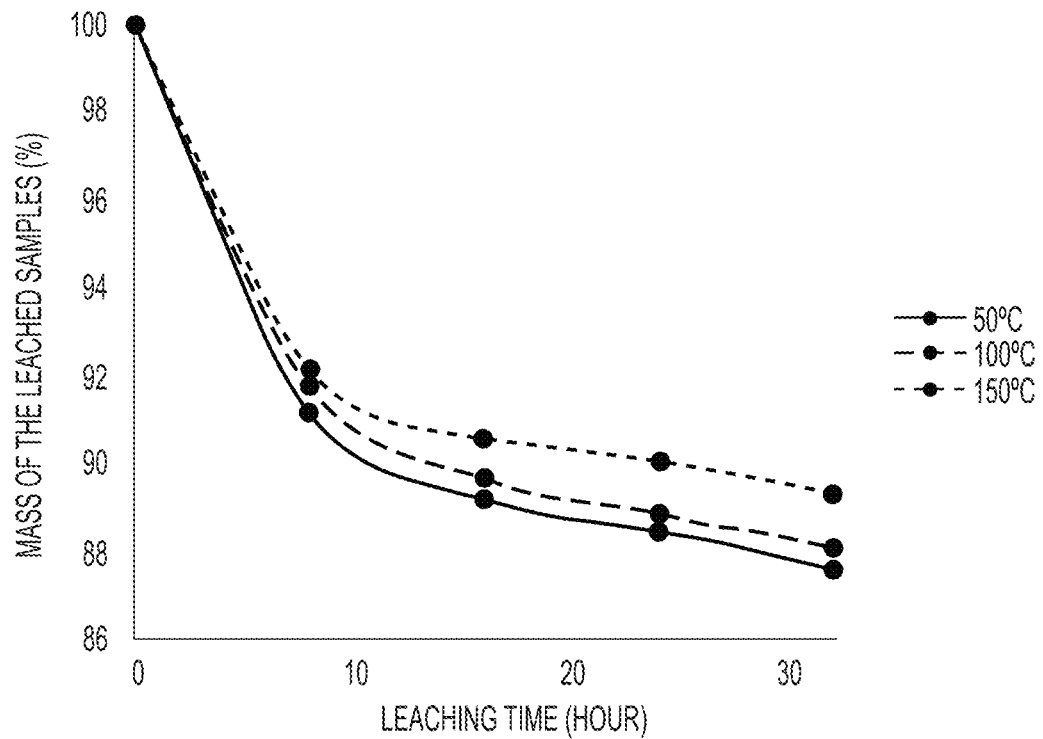
FIG. 16 shows the percent decrease in the mass of the wood samples impregnated with sodium silicate during the leaching experiments, in thermal treatment with hot water, when the impregnated wood samples were reacted with water at 50° C., 100° C., and 150° C. for 2 hours.

In thermal treatment with hot water, the impregnated samples were reacted with water at 50° C., 100° C., and 150° C. for 2 hours and further analyses was conducted to determine the silica content in the treated samples. The percent decrease in the mass of the wood samples impregnated with sodium silicate during the leaching experiments is shown in FIG. 16.

Initially, the percent of the retained mass decreased at substantially the same rate until 10 hours, where it diverged. Less mass was lost at 150° C. than at 50° C. and 100° C. The most mass was lost at 50° C. This may be due to the fact that most of the extractables from the samples were already extracted during the hot water treatment process and just a fraction of the remaining extractables were leached out during the leaching process, resulting in a gradual decrease in mass of the samples with time. The percent mass retained was higher at 50° C., 100° C., and 150° C. than in the hot air heat treatment results shown in FIG. 14.

Figure 17:
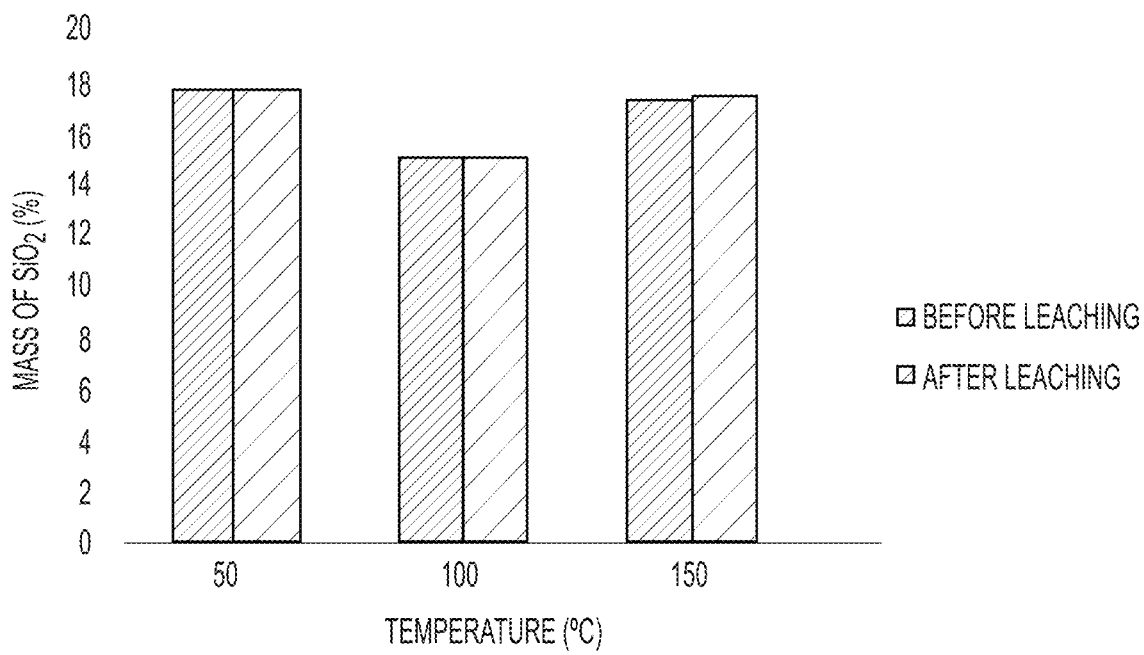
FIG. 17 shows the mass percent of silicon dioxide ($SiO_2$) retained in the impregnated wood samples before and after the leaching tests of the samples treated with hot water at the different temperatures.

The mass percent of silicon dioxide ($SiO_2$) retained in the impregnated wood samples before (blue bars) and after (orange bars) the leaching tests of the samples treated with hot water at the different temperatures are shown in FIG. 17. The change in the mass percent of $SiO_2$ in the impregnated samples was similar in all the cases.

The pH of the leachate after each leaching cycle was monitored. The pH of the leachate during the early cycle was very high (of the same order of magnitude as sodium silicate solution), and gradually decreases with the increase in leaching time.

3. Samples Treated with Water Vapor

Figure 18:
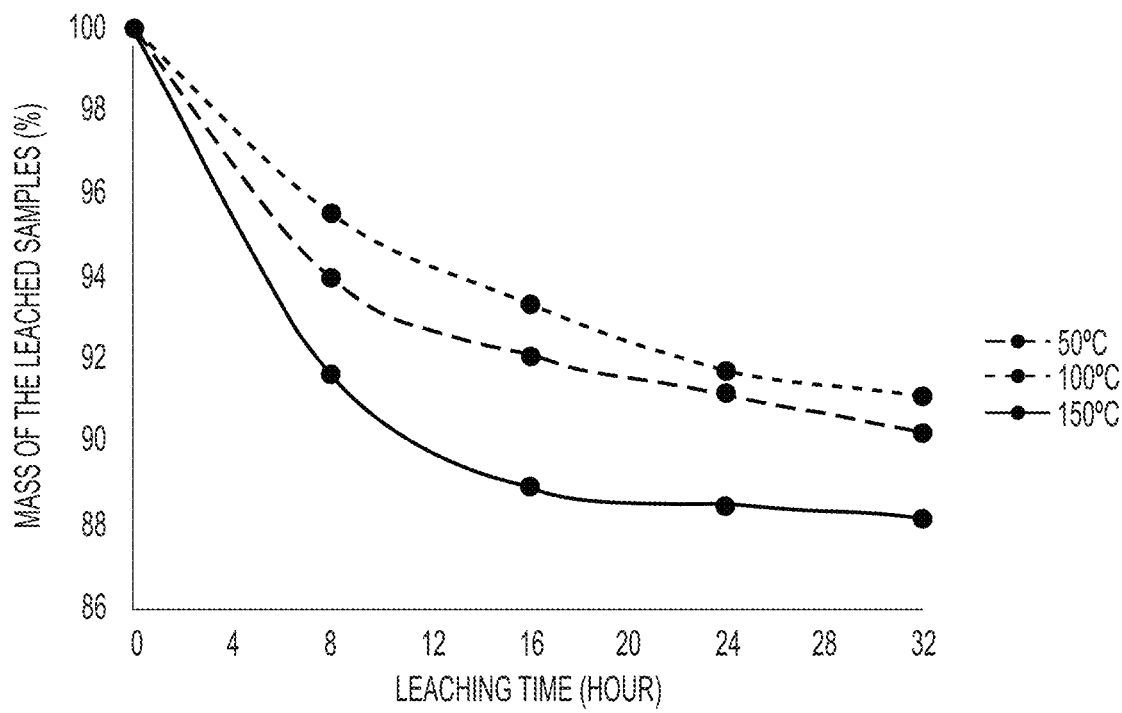
FIG. 18 shows the results of the leaching trials of the sodium silicate impregnated wood samples treated with saturated water vapor at 50° C., 100° C., and 150° C.

The results of the leaching trials of the sodium silicate impregnated samples treated with saturated water vapor at 50° C., 100° C., and 150° C. are shown in FIG. 18. The loss in mass of the impregnated wood samples was least in the wood samples treated with water vapor at 100° C. and higher at 150° C. The tendency of the loss in mass of the samples in FIG. 18 is similar to those observed in FIG. 14.

Figure 19:
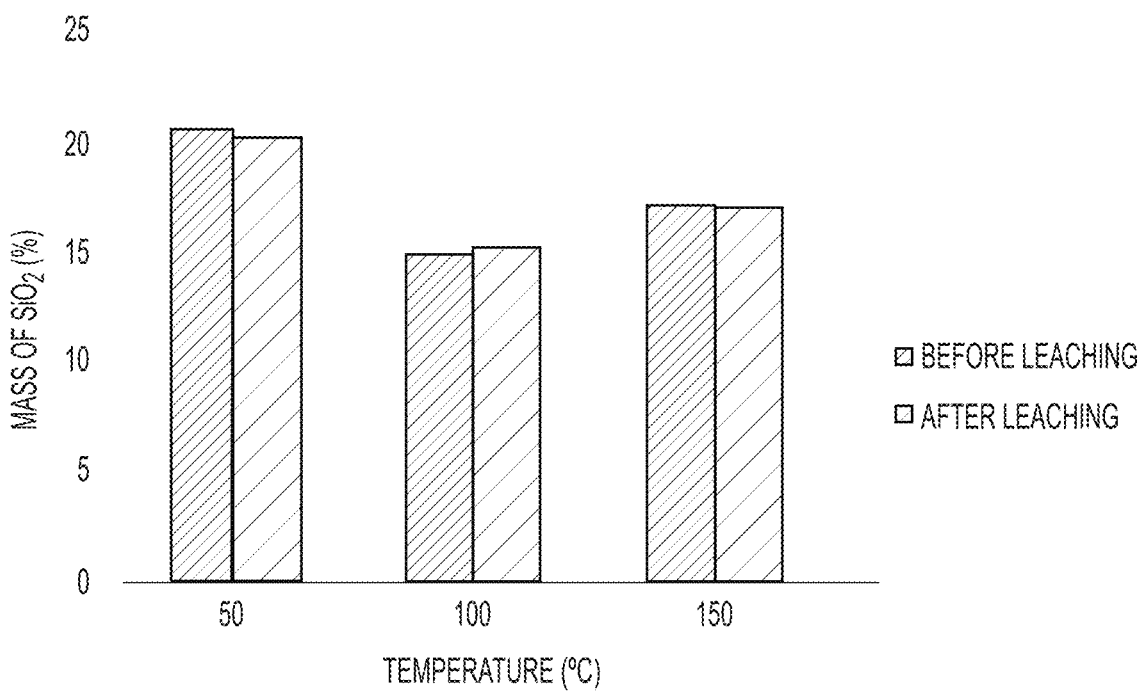
FIG. 19 shows the mass percent of silicon dioxide ($SiO_2$) retained in the impregnated wood samples before and after the leaching tests of the samples treated with saturated water vapor at different temperatures.

The change in the mass percent of silicon dioxide in the impregnated samples before (blue bars) and after (orange bars) the leaching tests of the samples treated with saturated water vapor at different temperatures is shown below in FIG. 19. The masses before and after leaching at the different temperatures was substantially the same.

pH Change Treated Samples by Gaseous $CO_2$ Under Pressure

1. Samples Treated by Gaseous $CO_2$ Under Pressure without Water

Figure 20:
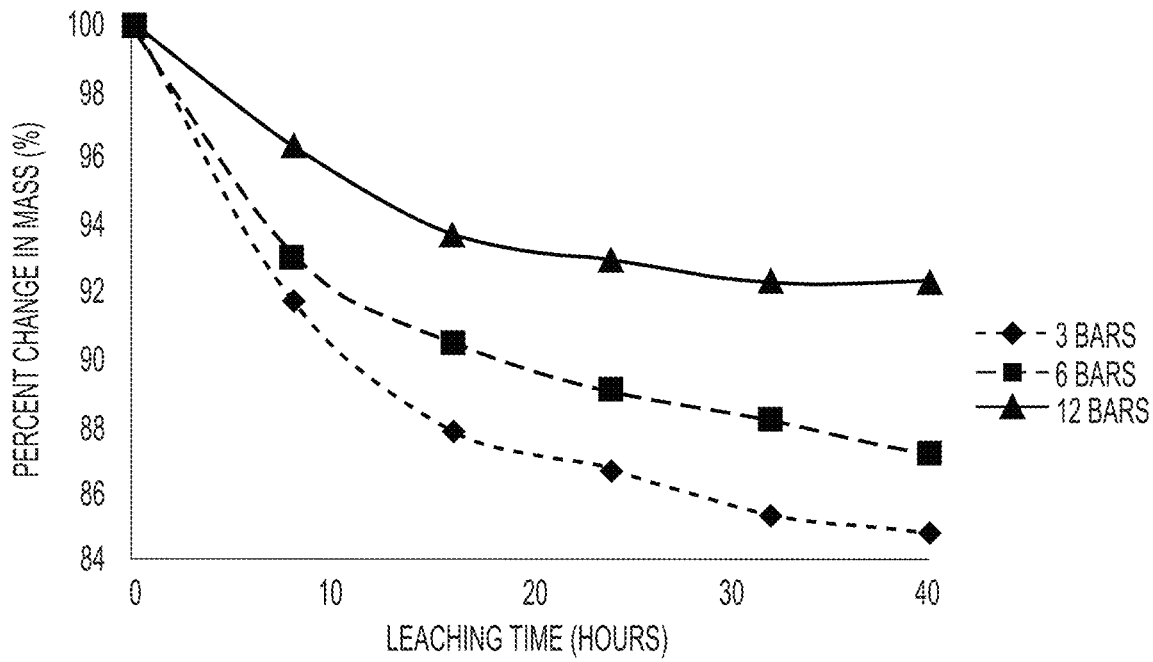
FIG. 20 shows the percent of retained mass of sodium silicate impregnated wood samples treated with gaseous carbon dioxide at the different pressures during the leaching tests, over time.

In these trials, the impregnated samples were treated with gaseous carbon dioxide under pressure at 3 bars, 6 bars, and 12 bars. FIG. 20 shows the percent of retained mass of sodium silicate impregnated wood samples treated with gaseous carbon dioxide at the different pressures during the leaching tests, over time. The leaching tests involved placing heat treated samples of size 2×2×2 cm into 330 ml of distilled water in a 600 ml beaker, which was stirred for 8 hours. Then the samples were dried at 60° C. for 16 hours. Four leaching cycles were performed for each of the samples.

As shown in FIG. 20, increasing the treatment pressure decreases the mass loss from the samples during the leaching tests. This indicates that more carbon dioxide gas impregnates the wood samples and reacts with the sodium silicate solution already inside the wood, as the treatment pressure is increased.

As discussed above, the carbon dioxide lowers the pH of the impregnated wood from about 11 after impregnation to about 9 after $CO_2$ treatment. This is due to reaction of the carbon dioxide with water to form carbonic acid ($H_2CO_3$), which is a mild acid. The carbonic acid further reacts with sodium silicate ($Na_2SO_3$), yielding silicon dioxide ($SiO_2$) and sodium carbonate ($Na_2CO_3$). Sodium bicarbonate ($NaHCO_3$) may also be produced but due to the moderately acidic environment created by the distilled water, which has a pH of 5.1, the formation of sodium carbonate is more likely. These reactions may enable the sodium silicate to better adhere to the cell walls of the lumber during impregnation, avoiding leakage of the sodium silicate out of the lumber.

As indicated in the above trials, the change in mass of the samples is not due to the leached silicon dioxide, but may be due to the loss of lignin at high temperature and the loss of sodium compounds. In this case, the loss in mass of the samples during the leaching process may be due to the loss of unreacted sodium hydroxide and sodium carbonate, which has low solubility in water at room temperature.

Figure 21:
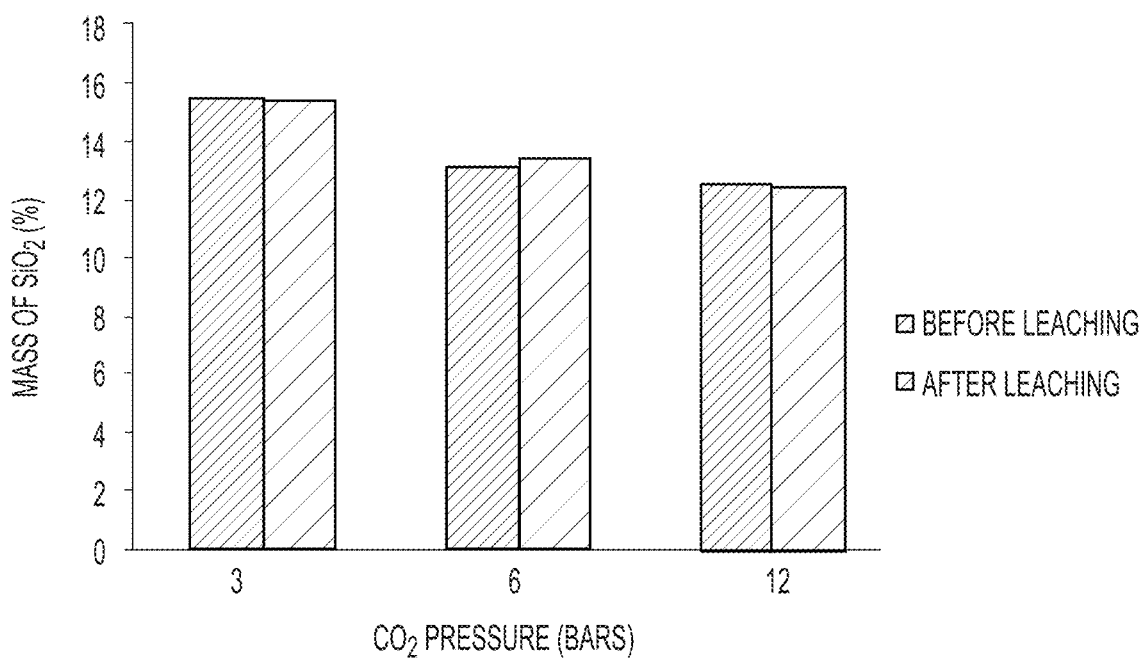
FIG. 21 shows the mass percent of silicon dioxide in the impregnated wood samples before and after the leaching tests of the samples treated with gaseous carbon dioxide at different pressures.

The silicon dioxide content of the leached and unleached samples were also determined. FIG. 21 shows the mass percent of silicon dioxide in the impregnated wood before (blue bars) and after (orange bars) the leaching tests of the samples treated with gaseous carbon dioxide at different pressures.

FIG. 21 is consistent with the results in the trials with leaching of heat treated samples, that there are essentially no changes in the silicon dioxide content of the impregnated wood samples due to leaching.

2. Samples Treated with Water in a $CO_2$ Environment Under Pressure.

Figure 22:
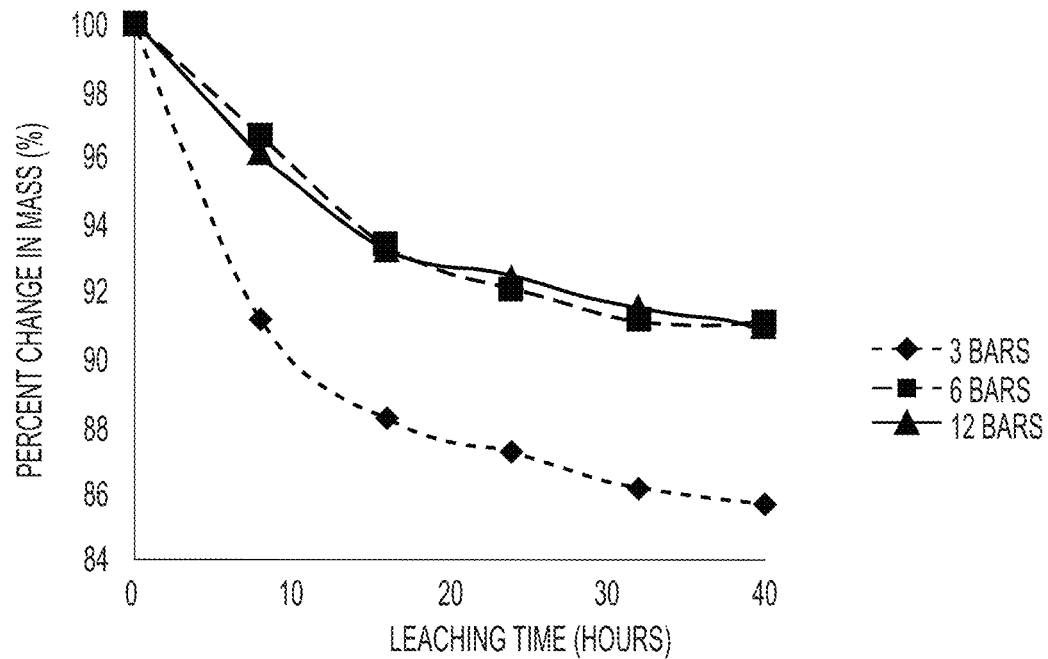
FIG. 22 shows the mass percent of the sodium silicate impregnated wood samples retained during the leaching tests, when the impregnated wood samples were immersed in water inside an impregnation vessel and then treated with gaseous carbon dioxide at different pressures.

Impregnated wood samples were immersed in water inside an impregnation vessel and then treated with gaseous carbon dioxide at different pressures. The results obtained in these trials are summarized in FIG. 22, which shows the percent of the mass of the sodium silicate impregnated wood samples retained during the leaching tests.

There does not appear to be much differences in mass change when the impregnated samples are immersed in water at 6 bars and 12 bars. This may be due to the formation of equivalent amount of sodium carbonate and/or a similar rate of leaching of the sodium carbonate along with sodium hydroxide. The change in mass of the samples treated with water under 3 bars of pressure was much more than at 6 bars and at 12 bars, which may be due to the lack of formation of sodium carbonate and sodium hydroxide, which are readily soluble in water and may have been readily leached out.

Figure 23:
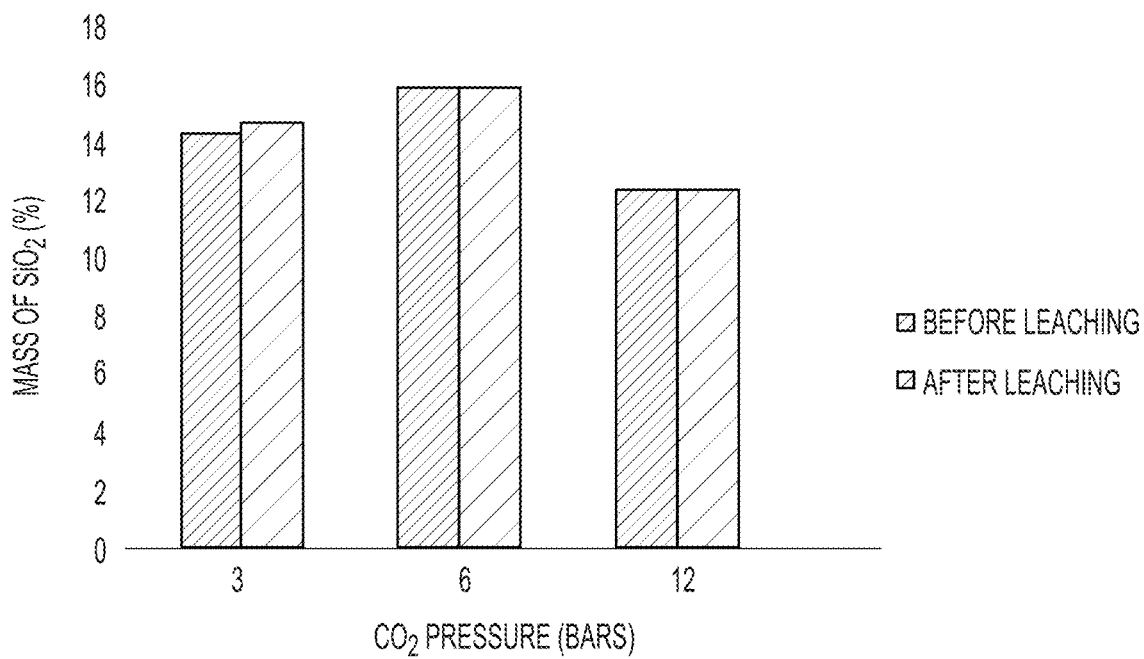
FIG. 23 shows the mass percent of silicon dioxide ($SiO_2$) retained in the impregnated wood samples before and after the leaching tests of the samples immersed in water inside an impregnation vessel and then treated with gaseous carbon dioxide at different pressures.

The silicon dioxide content of the leached and unleached samples was also determined. The results are shown in FIG. 23, indicating that the silicon dioxide content was substantially the same before and after leaching.

Comparison of Fixation Strategies

A comparison among the treatment strategies to fix sodium silicate inside the wood samples is presented.

The heat treated samples were subjected to acid digestion. The results for the samples dry air heat treated samples at 50° C., 100° C., 150° C. and water vapor heat treated samples at 150° C. are compared to determine the effect of heat treatment in the silicon dioxide content. The results are shown in Table 8, below:

TABLE 8

| Treatment method | SiO2 content (%) |
| --- | --- |
| Dry air at 50° C. | 15.447 |
| Dry air at 100° C. | 15.2954 |
| Dry air at 150° C. | 15.2116 |
| Water vapor at 150° C. | 15.2711 |

Figure 24:
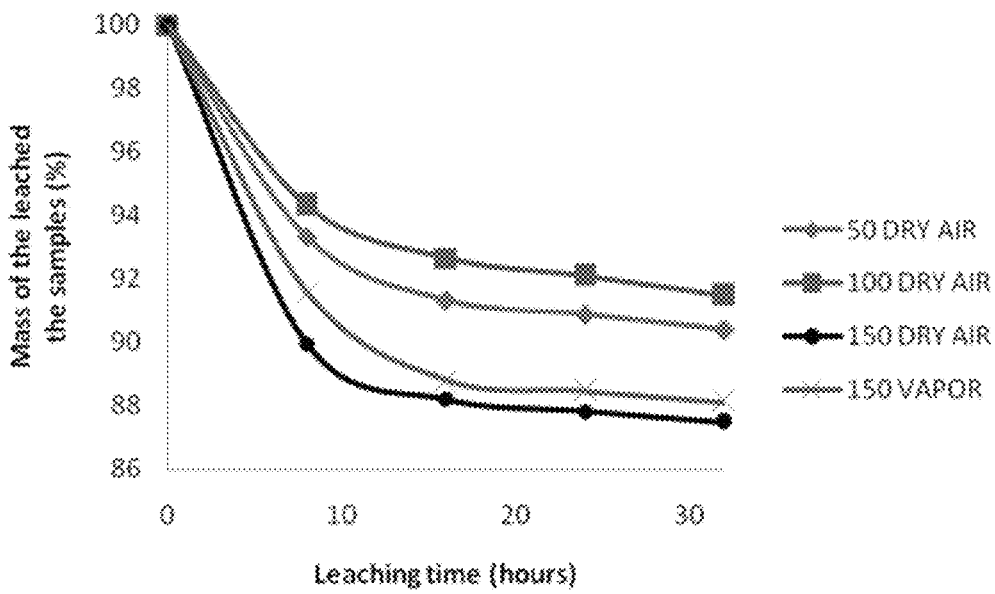
FIG. 24 shows the percent decrease in the mass of the wood samples impregnated with sodium silicate prepared at 50° C., 100° C., 150° C. of dry air, and 150° C. of water vapor.

The leaching experiments were conducted according to the method described above. FIG. 24 shows the percent decrease in the mass of the wood samples impregnated with sodium silicate prepared at 50° C., 100° C., 150° C. of dry air, and 150° C. of water vapor. The percent reduction in weight of the wood samples after each drying process of 16 hours is shown in FIG. 24.

FIG. 24 shows a decrease in the mass of the impregnated samples with increasing time for all heat treatment strategies. The greatest mass retained was provided by 100° C. dry air, followed by 50° C. dry air, 150° C. vapor, and 150° C. dry air. The leaching test results show that heat treatment with dry air at 100° C. yields better results than the samples treated at 50° C. with dry air. This may be due to higher removal of water at higher air temperature and hence higher precipitation of silicate due to the lack of bridging oxygen.

It was observed that the samples released colored substances during the leaching process. The colored substances released during leaching of these samples may be lignins along with sodium silicate, indicating slight delignification. The decrease in overall mass of the samples may not, therefore, represent the loss of sodium silicate during the leaching process. The samples treated at higher temperature (150° C.) by both dry air and water vapor lost more mass and were slightly delignified.

Figure 25:
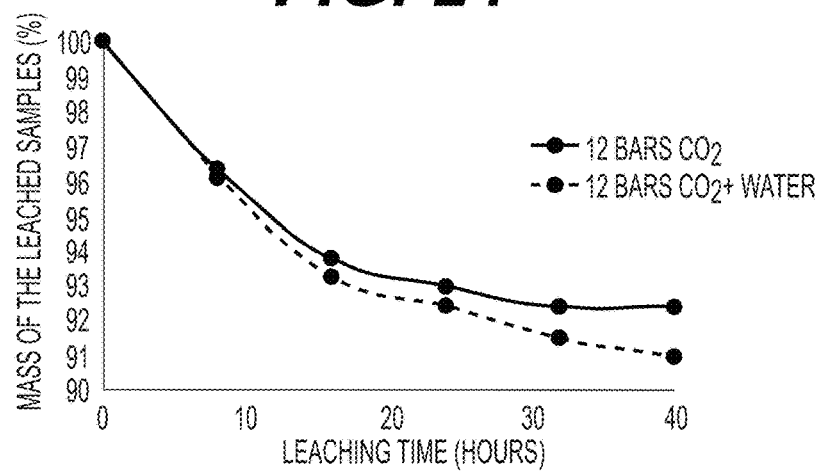
FIG. 25 compares the mass percent of the sodium silicate impregnated wood samples retained during the leaching tests for the samples by fixation with carbon dioxide gas at 12 bars and for the samples by fixation with carbon dioxide in water at 12 bars.
Figure 26:
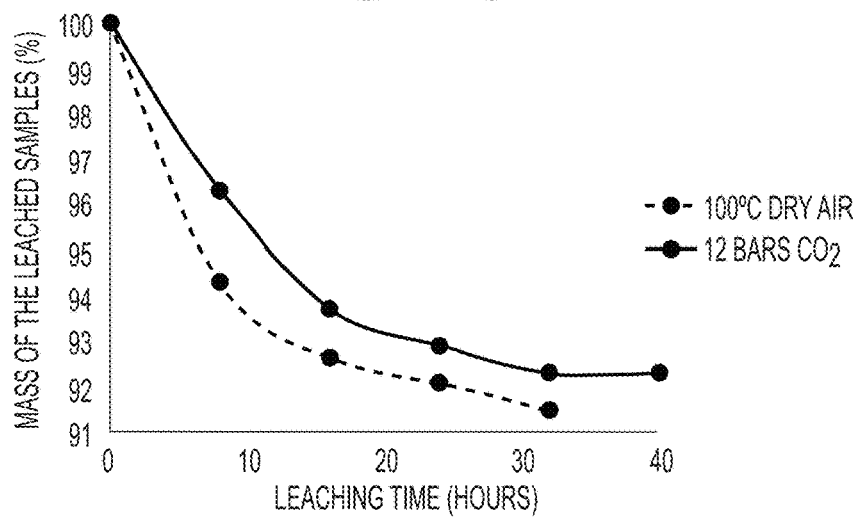
FIG. 26 compares the mass percent of the sodium silicate impregnated wood samples retained during the leaching tests for the samples by heat treatment at 100° C. of dry air and for the samples by gaseous carbon dioxide at 12 bars.

A general comparison among the heat treatments and pH change treatments of the impregnated samples before leaching is presented in FIG. 25 and FIG. 26, respectively, where only the treatment process in which least loss of samples mass during the leaching process was noted has been presented.

FIG. 25 compares the mass of the leached samples for fixation with carbon dioxide gas at 12 bars and for fixation with carbon dioxide in water at 12 bars.

After 10 hours, more mass was retained when the fixation treatment was gaseous carbon dioxide at 12 bars.

FIG. 26 compares heat treatment at 100° C. of dry air and gaseous carbon dioxide at 12 bars.

More mass was retained with a pH change treatment with gaseous carbon dioxide at 12 bars than with a heat treatment of 100° C. dry air. This tendency would further increase at higher pressures. Due to the pH of the water (pH=5.1) that was used for initial, impregnation treatment and the leaching process, it is likely that the silicon dioxide was already polymerized and precipitated due to lower pH of water.

These results from the above experiments conclusively indicate that the inventors' unique use of $CO_2$ under pressure as the primary fixation method for silicon dioxide ($SiO_2$) is highly effective in eliminating the probable leaching issues customary for many of the chemicals impregnated into lumber using forms of the pressure treated wood modification processes.

The three thermal treatment experiments outlined below in detail concluded the following important findings, namely, while the hot air and hot water treatments were partially efficacious, the use under pressure of gaseous $CO_2$ for fixation by the inventors was far superior as outlined in the gaseous $CO_2$ experiment section below, pH Treated Samples.

Example 2. A Double Impregnation Process for Further Improving Wood Protection Performance In this example, the wood sample preparation, impregnation process, and the fixation by pH change treatment by gaseous $CO_2$ under pressure as described above in Example 1 have been carried out as the first stage.

The process in the second stage described below involves the use of a second, shorter duration of impregnation, after the $CO_2$ fixation step in the first stage. In this second stage, a higher concentration of sodium silicate solution (i.e., a sodium silicate concentration higher than the sodium silicate concentration of the impregnation solution in the first stage, e.g., 10 to 15% $SiO_2$) was applied to the wood in the autoclave under a pressure of about 2 to 12 bar and a temperature of about 20 to 70° C., for a period of about 20 to 30 minutes. The purpose of this second impregnation is to provide additional surface protection to the wood, including adding an additional fire protection barrier.

This second impregnation shows a weight pick up averaging 104%, as compared to 98% in a single-stage impregnation process, as shown in Table 9 below, as well as in FIG. 27. This additional 6% weight pick up is considered important for additional lumber protection properties.

TABLE 9

Specimen weight gains after the impregnation treatment, comparing the results from the first stage impregnation (initial) and after the second stage impregnation (subsequent)

| | Calculation: | | |
| --- | --- | --- | --- |
| Specimen # | Weight 2 − Weight 1 % Weight Gain − Initial | Weight 4 − Weight 3 % Weight Gain − Subsequent | Weight 4 − Weight 1 % Weight Gain − Total |
| 1 | 53% | 10% | 52% |
| 2 | 107% | 14% | 125% |
| 3 | 99% | 20% | 127% |
| 4 | 96% | 20% | 123% |
| 5 | 104% | 5% | 112% |
| 6 | 44% | 21% | 110% |
| 7 | 97% | 9% | 112% |
| 8 | 109% | 6% | 111% |
| 9 | 127% | 7% | 136% |
| 10 | 104% | 9% | 111% |
| 11 | 95% | 8% | 109% |
| 12 | 122% | 7% | 124% |
| 13 | 67% | 6% | 58% |
| 14 | 46% | 6% | 39% |
| 15 | 105% | 4% | 103% |
| 16 | 157% | 4% | 98% |
| 17 | 131% | 5% | 136% |
| 18 | 60% | 8% | 55% |
| 19 | 113% | 5% | 115% |
| 20 | 108% | 2% | 110% |
| 21 | 110% | 2% | 112% |
| Average | 98% | 9% | 104% |

Where:
Weight 1 is Pre-initial impregnation weight
Weight 2 is Post-initial impregnation weight
Weight 3 is Pre-subsequent impregnation weight
Weight 4 is Post-subsequent impregnation weight The concept of weight pick-up indicates the first protection barrier in preparing pressure-treated lumber—the more chemical retained after impregnation, the better chance the wood has to resist fire, termite attack, rot and decay. The impregnation is combined with the second protection barrier—fixing or stabilizing the chemicals impregnated in the wood, to prevent leaching out of the impregnated chemicals and the associated lumber degradation with time. The wood-modification process illustrated in the examples balance the first and second protection barriers, the comprehensive chemical retention and long-term chemical stability, both of which being achieved without strength degradation. This is a unique and important mix of critical wood protection outcomes achieved comprehensively in the wood when using an all-sustainable chemical modification process.

Figure 27:
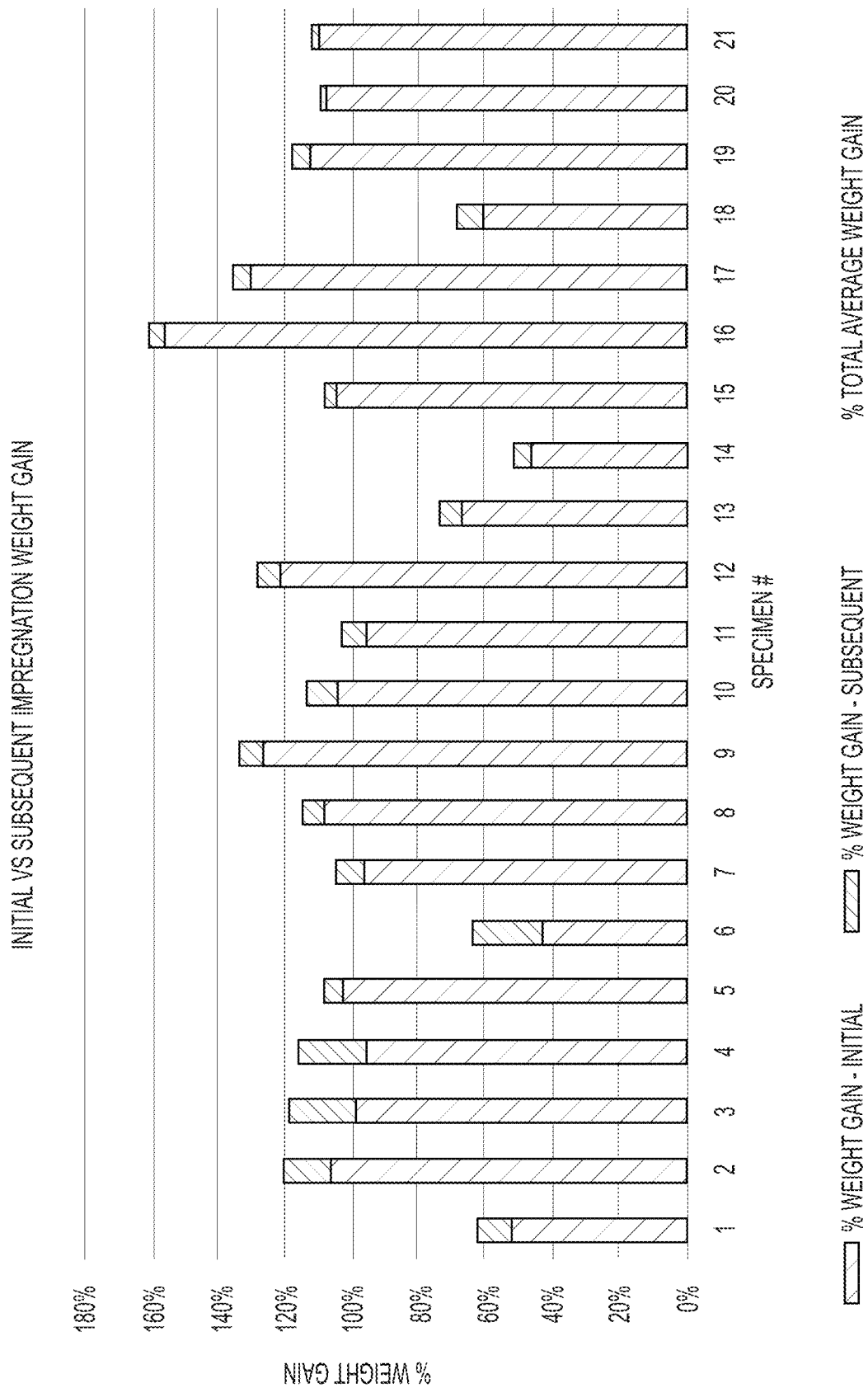
FIG. 27 shows the weight gain of the sodium silicate retained in the wood after the second impregnation treatment, as compared to the results from a single impregnation treatment.

The results in Table 9 and FIG. 27 indicate that the double impregnation provides a better barrier for attack by fire. The fixation by $CO_2$, followed by the second impregnation treatment, provides an additional layer of protection to make the wood less prone to burning, as shown in Table 10 below.

In this case, the E84 10-minute burn test was applied to both conventionally treated lumber (a phosphate-based treatment solution) and the wood treated by the inventive double impregnation process as described above, and the corresponding flame spread was measured. These tests were performed at an accredited ASTM Fire Testing Laboratory, using a 24' long Steiner Tunnel and applying the standard burn techniques for the E84 test.

The samples used were 2×4×8 untreated lumber: 2"×4", eight ft long #2 untreated lumber, which was kiln dried to approx. 19% (KD19). This lumber was run through the double impregnation process as described above and then dried in a conventional sawmill kiln using optimal drying schedules. These products were then isolated, wrapped and shipped to the ASTM testing facility, where they were burned within one week of manufacture.

The maximum flame front is a measure of the amount of advancement of the flame down the tunnel, as propagated by a methane burner, and measures the ability of the wood to resist flame spread. The stated limit of 6.0 ft from the measuring point (and 10.5' from the burner) is the industry standard for wood burning to not exceed, to obtain the Class "A" fire retardant rating.

Two tests were carried out—one for a 10-minute burn (ASTM E84) and one for a thirty minute burn (ASTM E2768). ASTM E-84: Standard Test Method for Surface Burning Characteristics of Building Materials. ASTM E2768: Standard Test Method for Extended Duration Surface Burning Characteristics of Building Materials (30 Minute Tunnel Test). These are part of the ASTM E119 or UL 263 that meet the global standards for fire retardant rating.

Figure 28:
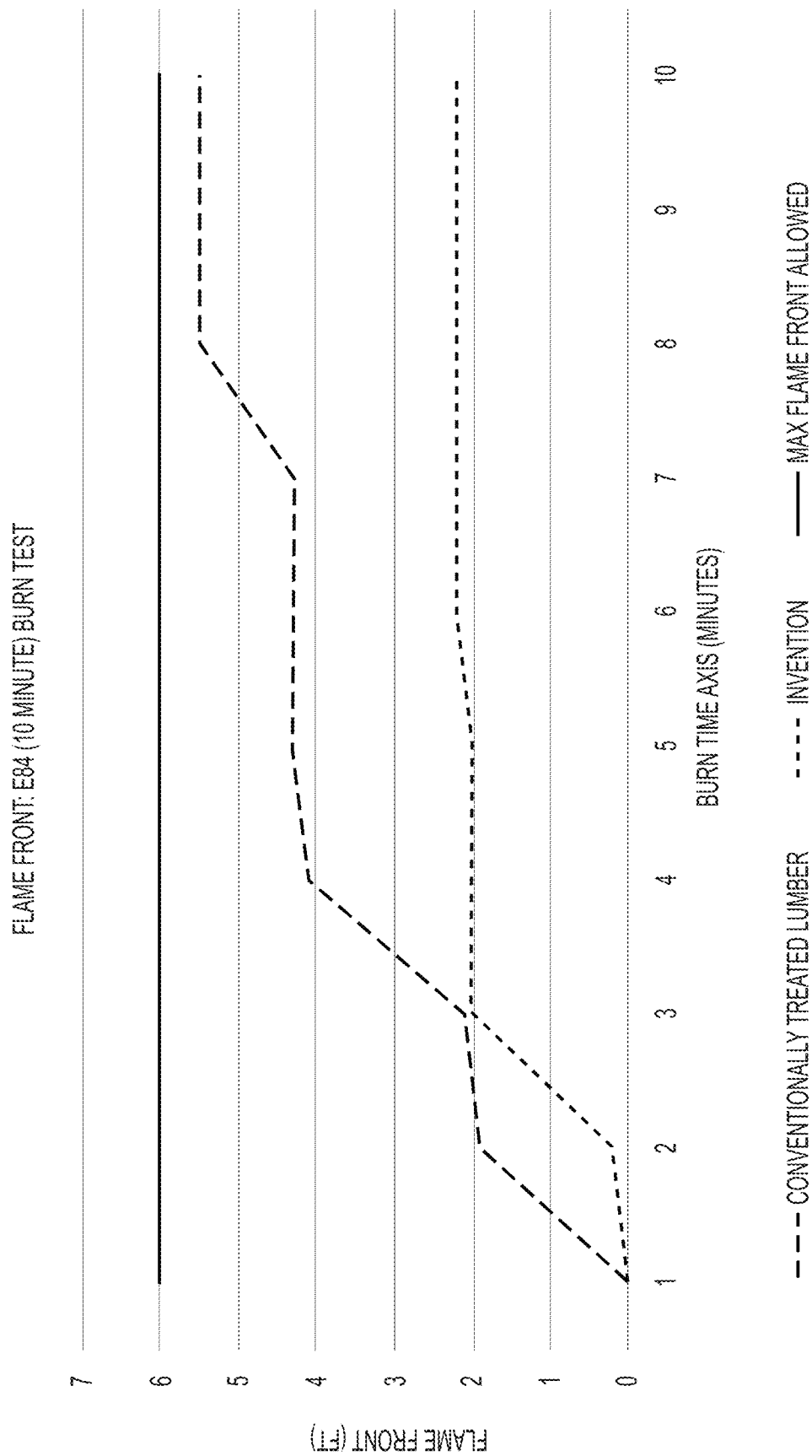
FIG. 28 compares the results of the E84 Burn tests for lumber modified by inventive double impregnation process vs. conventionally treated lumber.

The results of the first test are shown in Table 10 as well as in FIG. 28.

TABLE 10

E84 Burn tests for wood modified by inventive double impregnation process vs. conventionally treated wood.

| Time of burn (minutes) | Max Flame Front Allowable for Class A Fire Retardant (ft) | Actual Flame Front for Inventive Lumber (ft) | Actual Flame Front for Conventionally Treated Product (ft) |
|---|---|---|---|
| 1 | 6 | 0 | 0 |
| 2 | 6 | 0.2 | 0.8 |
| 3 | 6 | 2.0 | 2.2 |
| 4 | 6 | 2.0 | 2.8 |
| 5 | 6 | 2.0 | 3.8 |
| 6 | 6 | 2.2 | 4.0 |
| 7 | 6 | 2.2 | 4.2 |
| 8 | 6 | 2.2 | 4.3 |
| 9 | 6 | 2.2 | 4.4 |
| 10 | 6 | 2.2 | 4.4 |

It can be seen clearly here that the modified lumber by the inventive double impregnation process resulted in a lower flame spread down the tunnel, as compared to the lumber made with a conventionally treated process, by a factor of 170% (as compared to the 6' flame spread limit). Lower flame spread corresponds directly with flame retardancy and safety.

Figure 29:
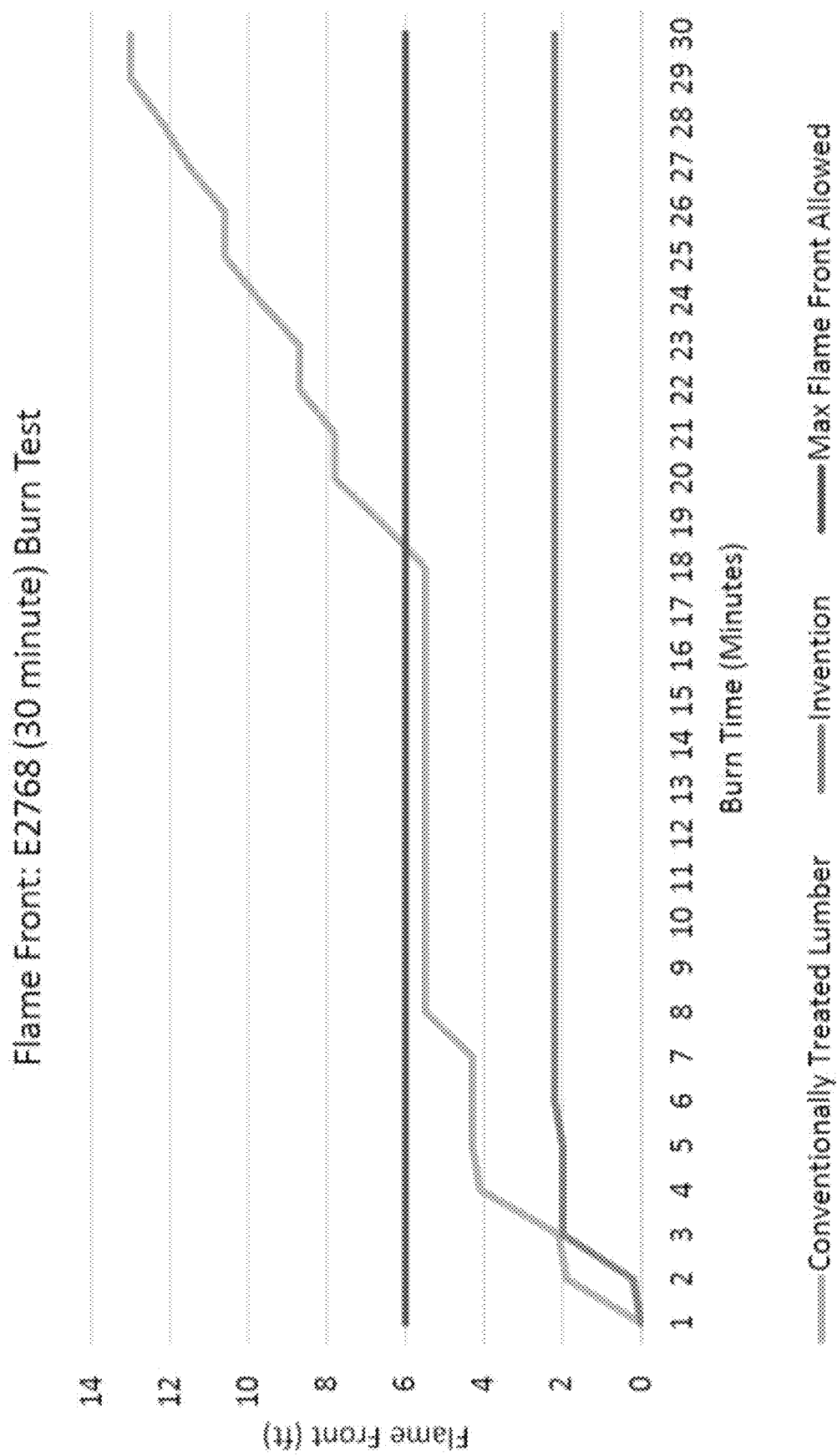
FIG. 29 compares the results of the E2768 Burn tests for lumber modified by inventive double impregnation process vs. conventionally treated lumber.
Figure 30:
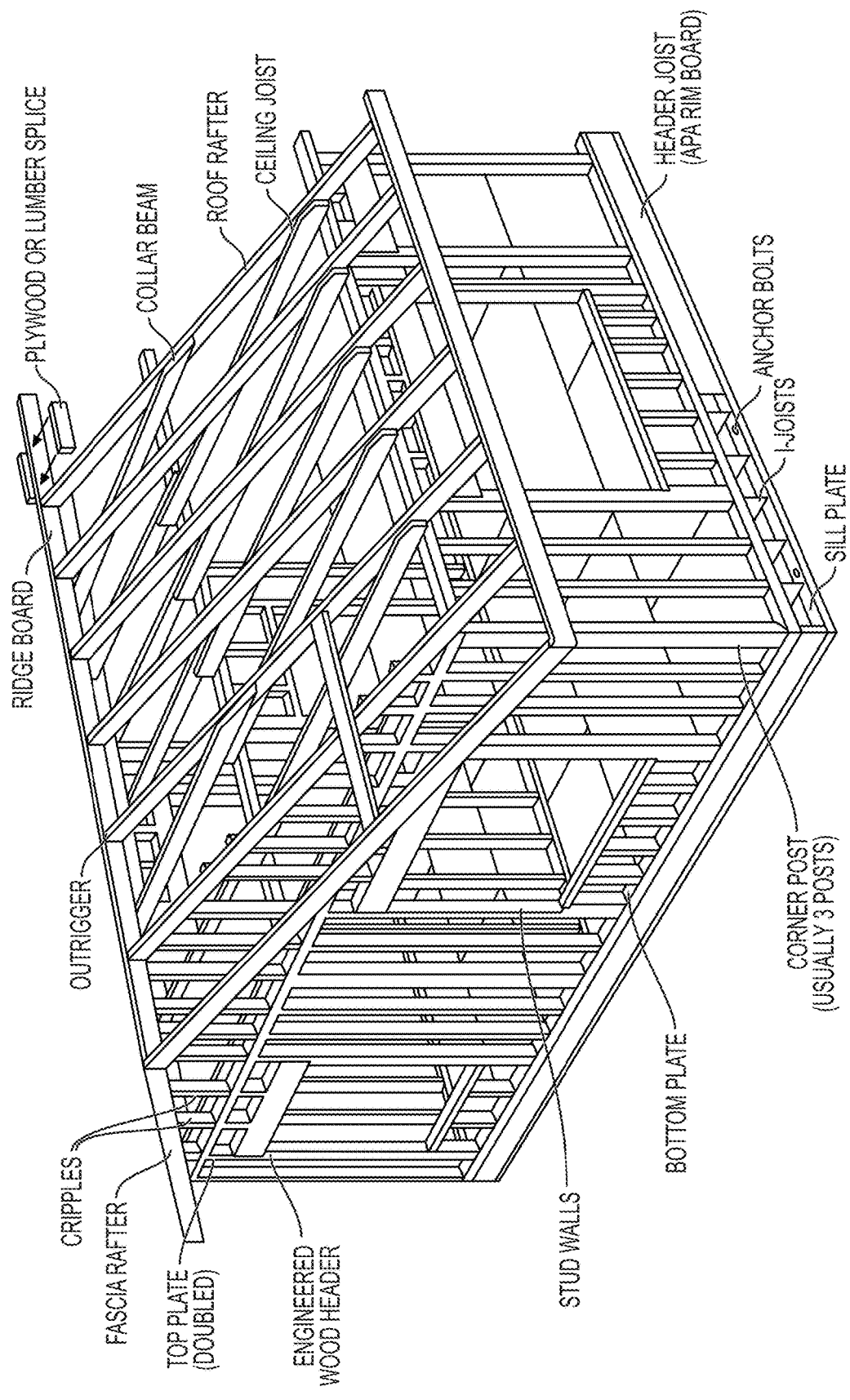
FIG. 30 is an illustration of construction applications of the product made according to the modification process described in the embodiments of this invention.

The more stringent test for measuring the burn characteristics of lumber is using the E2768 test—with the same Steiner tunnel, but for a period of thirty minutes. The results of this test are shown in Table 11 below as well as in FIG. 29.

TABLE 11

E2768 Burn tests for wood modified by inventive double impregnation process vs. conventionally treated wood.

| Time of burn (minutes) | Max Flame Front Allowable for Class A Fire Retardant (ft) | Actual Flame Front for Invention Lumber (ft) | Actual Flame Front for Conventional Treated Lumber (ft) |
|---|---|---|---|
| 1 | 6 | 0 | 0 |
| 2 | 6 | 0.2 | 0.8 |
| 3 | 6 | 2 | 2.2 |
| 4 | 6 | 2 | 2.8 |
| 5 | 6 | 2 | 3.8 |
| 6 | 6 | 2.2 | 4.0 |
| 7 | 6 | 2.2 | 4.2 |
| 8 | 6 | 2.2 | 4.3 |
| 9 | 6 | 2.2 | 4.4 |
| 10 | 6 | 2.2 | 4.4 |
| 11 | 6 | 2.2 | 4.5 |
| 12 | 6 | 2.2 | 4.5 |
| 13 | 6 | 2.2 | 4.5 |
| 14 | 6 | 2.2 | 4.5 |
| 15 | 6 | 2.2 | 4.5 |
| 16 | 6 | 2.2 | 4.5 |
| 17 | 6 | 2.2 | 4.5 |
| 18 | 6 | 2.2 | 4.5 |
| 19 | 6 | 2.2 | 4.5 |
| 20 | 6 | 2.2 | 4.5 |
| 21 | 6 | 2.2 | 4.5 |
| 22 | 6 | 2.2 | 4.5 |
| 23 | 6 | 2.2 | 4.5 |
| 24 | 6 | 2.2 | 4.5 |
| 25 | 6 | 2.2 | 4.5 |
| 26 | 6 | 2.2 | 5.3 |
| 27 | 6 | 2.2 | 5.3 |
| 28 | 6 | 2.2 | 6.3 |
| 29 | 6 | 2.2 | 7.5 |
| 30 | 6 | 2.2 | 8.5 |

This data shows, once again, the superior performance of the modified lumber by the inventive double impregnation process over the thirty minute time test as compared to the conventionally treated product and the ability of the lumber modified by the inventive double impregnation process to meet or exceed the stated Class "A" fire retardant standard. In this case the improvement is 350%, as compared to the 6' limit over the 30-minute test.

Example 3. Relative Strength Properties

The change in the relative strength properties of the wood is important, particularly in the context of FRT wood which until now has been regarded as requiring a compromise on strength in order to achieve required safety for fire risk. Traditional fire-retardant treatment processes (typically phosphate based) have been shown to reduce the strength properties of the wood (in terms of Tensile strength, MOR and MOE). However, as shown in Table 12 and Table 13 below, for wood samples made according to the modification process described in the embodiments of this invention (Inventors' Impregnation), the strength properties have not been reduced but actually stabilized and in some cases, significantly improved, as compared against the untreated SYP control.

Figure 31:
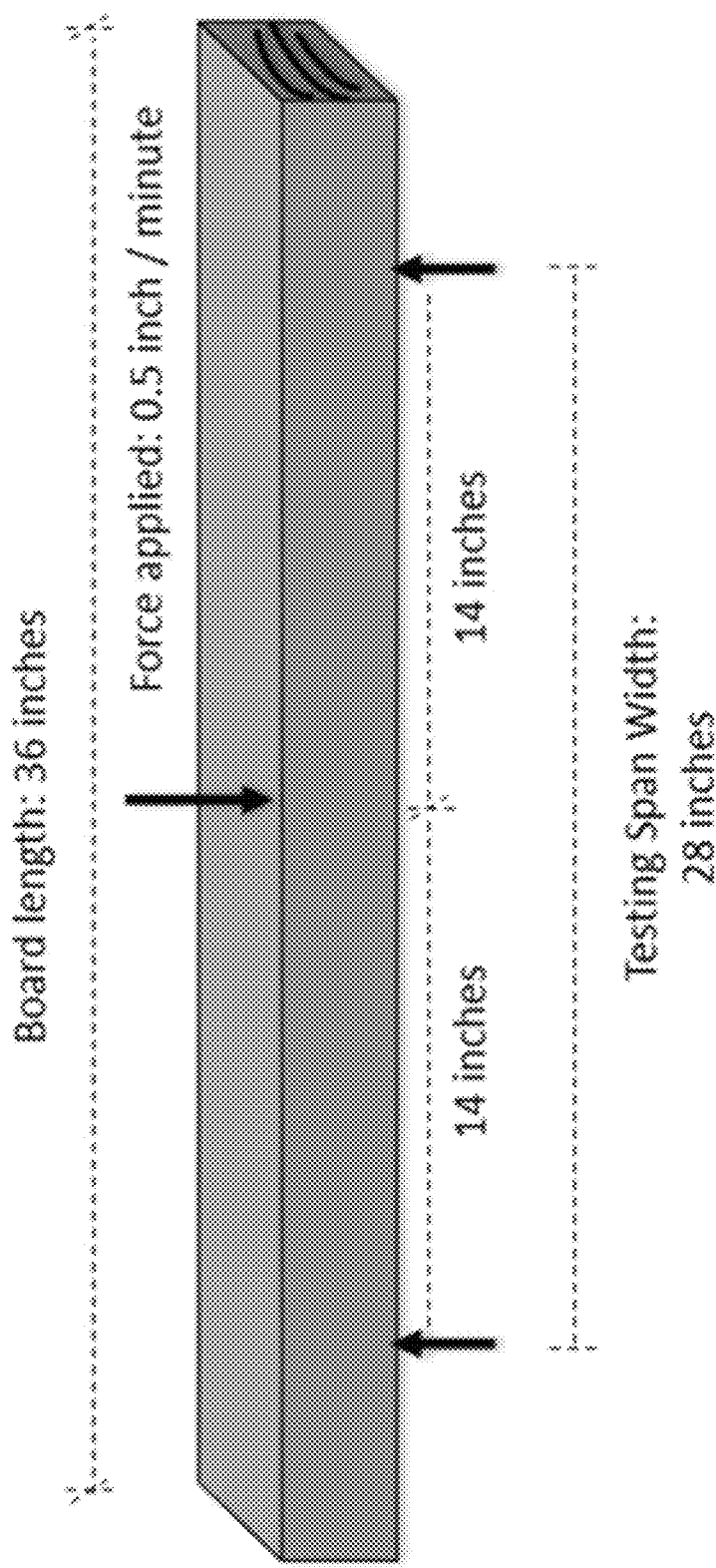
FIG. 31 illustrates the wood sample preparation according to ASTM D143-14.

Sample lumber dimensions were cut 1 inch in width by dimensional thickness (which was approximately 1.5 inches). The span used for testing was 28 inches. The test speed was 0.5 inch per minute and was run on an MTS electromechanical universal test frame with a 2,000-pound loadcell. The strength properties were measured by ASTM D143-14, which are The Standard Test Methods for Small Clear Specimens of Timber. See FIG. 31.

TABLE 12

Strength Properties of Lumber Comparison
Data for Strength Properties of Lumber

| | MOR (ksi) | MOE (psi) | Tensile (lbf) |
|---|---|---|---|
| SYP Control | 12,280 | 2,094 | 2,117 |
| Inventors' Impregnation | 12,787 | 2,866 | 1,925 |
| Conv. Phosphate Treated lumber | 10,881 | 1,350 | 2,194 |

The relative improvements of these strength properties, as measured against the SYP control (untreated) sample and the typical conventional phosphate treated wood are shown in Table 13 below.

TABLE 13

Inventors' impregnation as compared
to SYP control and conventional FRT wood
Inventors' Impregnation as Compared to: (% Improvement)

| | MOR | MOE | Load at Break |
|---|---|---|---|
| SYP Control | 4.1% | 36.8% | (9.0%) |
| Conv. Phosphate Treated lumber | 17.5% | 112.4% | (12.2%) |

The above data show the significant improvement of the strength properties. In particular, the MOE of the wood sample modified by the inventors' impregnation process has improved over 112% relative to conventional FRT wood, and over 30% relative to untreated SYP control wood. These results indicate a ground breaking paradigm shift in the FRT wood landscape and would allow for fundamental review of the use of the inventors' all-green superior strength fire retardant lumber product in numerous applications as described herein, both in terms of substituting conventional non-sustainable FRT wood as well as making use of FRT wood for additional fire safety where previously strength degradation was an accepted compromise and often also a major hurdle to both design and cost challenges.

Figures 32A, 32B:
FIG. 32A and FIG. 32B show the strength properties (FIG. 32A) and relative strength properties (FIG. 32B) of lumber modified by inventive process vs. conventionally treated lumber vs. untreated control.

The data are also summarized in FIG. 32A and FIG. 32B. Improvements to lumber samples modified by the process according to the embodiments in this invention in MOE, and MOR properties averaged +36.9% (MOE) and +4.0% (MOR), respectively, as compared to the untreated SYP control lumber samples, with the Tensile being statistically similar.

As compared to non-sustainable treated lumber (conventional phosphate treated lumber), these performance improvements show a significant improvement in the MOE (+112%) and MOR (+18%). This factor is significant in the lumber construction industry with the added strength and flexibility improvements directly impacting cost and design flexibility and usage.

Using non-sustainable treated/modified Southern Yellow Pine utilized in wall/floor environments and trusses in roof framing, using current industry leading processes and formulations that are NOT sustainable and testing these samples using industry standard testing as defined by, for instance, ASTM D5664 (ASTM D5664 is Standard Test Method for Evaluating the Effects of Fire-Retardant Treatments and Elevated Temperatures on Strength Properties of Fire-Retardant Treated Lumber) and ASTM D6841 (ASTM D6841 is Standard Practice for Calculating Design Value Treatment Adjustment Factors for Fire-Retardant-Treated Lumber), the adjustment factors for MOR and MOE are known to be approximately 0.80 to about 0.95 as compared to the Southern Yellow Pine (SYP) untreated control. In comparison, the ranges for the inventor's modified lumber, according to the modification processes described in the embodiments of this invention, are expected to be approximately from 1.05 to greater than 1.40, as compared to the Southern Yellow Pine (SYP) untreated control (as derived from the testing data utilized to prepare samples shown in FIG. 31 and FIG. 32A and FIG. 32B. This result is unprecedented and further is counter to other non-sustainable modified wood products and their manufacturing/treatment processes, especially those used for preparing fire-retardant-treated (FRT) wood, where mechanical strength properties are generally reduced during the impregnation process.

In addition, as shown in the widely referenced analysis of conventional FRT wood treatments, there is a significant deterioration in the strength properties of fire retardant lumber and other non-sustainable chemical preservative treated wood products over time after exposure to natural elements including temperatures, microbial and ultra-violet rays. Therefore, starting with a significantly higher range of strength parameters such as MOE and MOR in a FRT product as seen in the all-green high performance wood when used in construction environments exposed to degradation elements is a major paradigm shift to the current FRT lumber landscape and the design and material usage and cost reduction implications for architects and builders could be significant given these results. See Winandy and Rowell, "*Chemistry of Wood Strength*" Handbook of wood chemistry and wood components, pages 303-347 (CRC Press, Roca Raton, Florida, 2005).

Example 4. Rot and Decay Resistance

The all-green wood made with a sodium silicate impregnation solution according to the modification process described in the embodiments of this invention provides an effective barrier to rot and termites, while also retaining the fire and strength benefits from the modification process. To support these findings, certain tests were carried out in a leading lumber research and development and testing facility in Chile and Uruguay using the appropriate species. The results show that the modification process described in the embodiments of this invention with sodium silicate impregnation solution effectively protects wood from degradation from fungi, although a combination of sodium silicate and sodium borate provided the best resistance profiles for rot and decay. However, when combined with sodium silicate in the impregnation solution, an environmentally safe level of boron of no more than 0.5% by wt. would be more than sufficient to resist fungal attack.

Samples of wood were prepared according to the modification process described in the embodiments of this invention with sodium silicate, along with other types of chemical agents, and tested according to ASTM D1413-07 *"Standard Test Method for Wood Preservatives by Laboratory Soil-Block Cultures"*.

Additionally, in order to provide broader results and provide control measures, samples were also evaluated according to European Standard EN 113 *"Wood preservatives—Test method for determining the protective effectiveness against wood destroying basidiomycetes—Determination of the toxic values"* All tests were conducted at the Tacuarembó headquarters of the University of the Republic in Uruguay with samples of *Pinus radiata* and *Pinus taeda*.

Rot Tests Results According to Standard D1413-07

Figure 33:
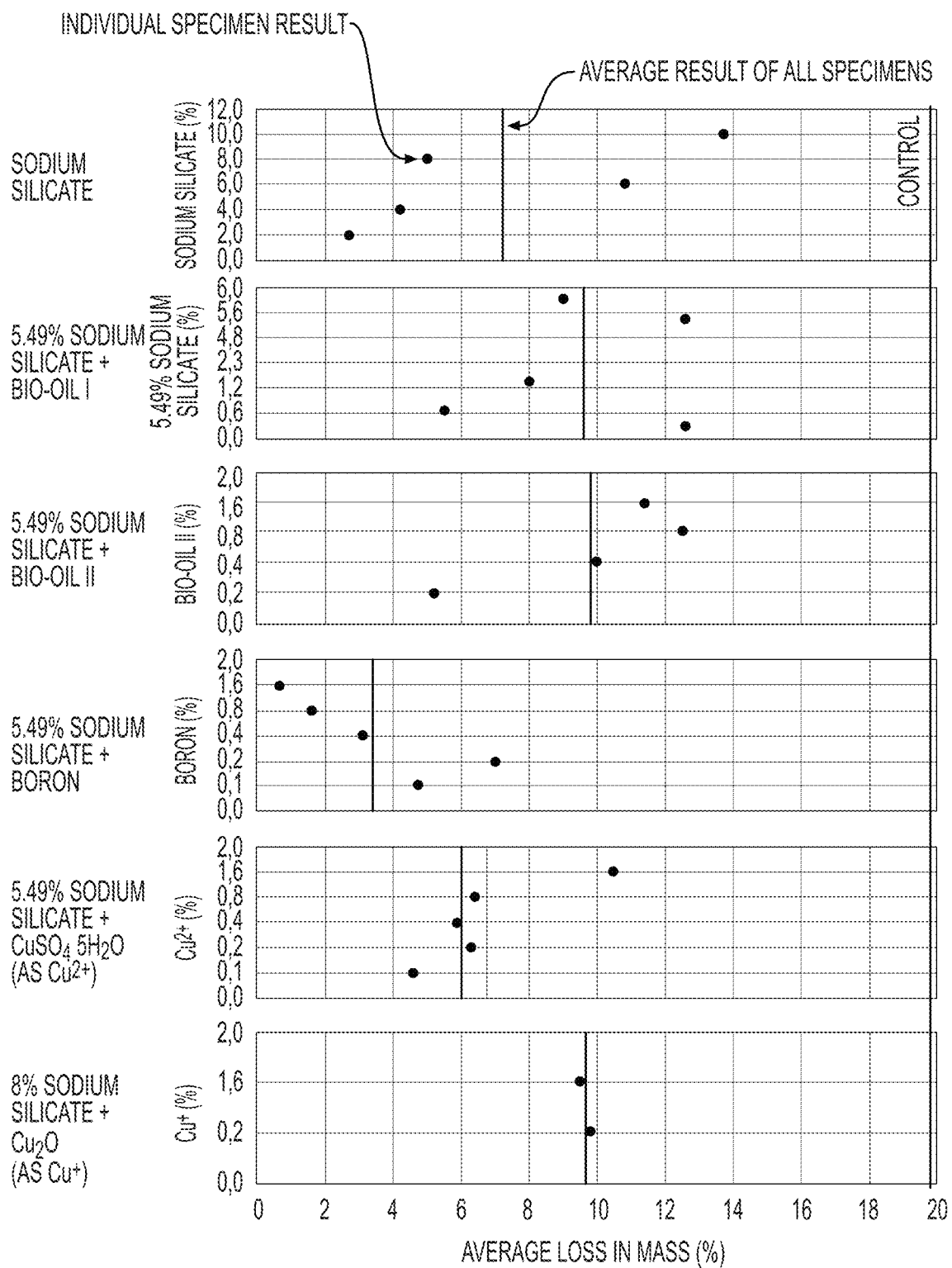
FIG. 33 summarizes the weight loss of samples treated with sodium silicate and various other chemical agents. The specimens were subjected to the action of brown rot fungi, *Serpula lacrymans* (standard D1413-07). The X-axis refers to average weight loss %, and the Y-axis refers to the concentration of specific chemical treatment (from the top to the bottom: sodium silicate, sodium silicate+bio oil I, sodium silicate+bio oil II, sodium silicate+sodium borate, sodium silicate+copper II, and sodium silicate+copper I, respectively). The control corresponds to untreated wood, shown as vertical black line on the right across all charts, showing 19.7% average weight loss.

FIG. 33 shows a summary of the results of resistance to degradation from exposure to the dry rot fungi, *Serpula lacrymans*, under standardized conditions. A summary of the observations is listed below:

Sodium Silicate: Sodium silicate treated wood showed a weight loss of 7.3%, which was substantially less than the untreated control sample showing a weight loss of 19.7%. This confirms that impregnation according to the modification process described in the embodiments of this invention with only sodium silicate effectively protects wood from degradation from dry rot fungi, *Serpula lacrymans*.

Sodium Silicate+Bio Oil I and Sodium Silicate+Bio Oil II: Different proportions of Bio Oil I (aqueous phase of pyrolytic pine bark liquid) and Bio Oil II (oily phase of pyrolytic pine bark liquid) were added to a sodium silicate solution containing 5.49% $SiO_2$. The results obtained with both agents were similar; no improvements to the resistance of fungus were noted. In fact, a small increase in degradation was noted.

Sodium Silicate+Sodium Borate: Differing proportions of sodium borate were added to a sodium silicate solution containing 5.49% $SiO_2$. This combination provided the best results of observed weight loss. Between 0.6% and 7% (with an average of 3.4%) weight loss was observed. This shows a trend of increased resistance to fungal attack by increasing boron concentration. Importantly, the Inventors concluded that an environmentally safe level of Boron, under 0.5%, was more than sufficient when being used with Sodium Silicate to resist fungal attack.

Sodium Silicate+copper II salts: Differing proportions of copper sulfate were added to a sodium silicate solution containing 5.49% $SiO_2$. While copper 0 and copper 1 are known to be effective preservatives, copper II was tested as it is more water soluble and consequently was hypothesized that wood impregnation should be more effective. Results show that wood mass losses were slightly lower than when impregnating only with sodium silicate (6.7% average loss vs 7.3% average loss, respectively). Both results show improvements over the untreated control samples showing an average weight loss of 19.7%.

Sodium Silicate+copper I salts: Only two tests were conducted with cuprous oxide; this compound is not soluble in water and notoriously difficult to achieve efficient penetration. Results were not shown to be promising as evidenced by larger weight loss in these specimens.

Rot Tests According to Standard EN 113

Table 14 illustrates the testing results of the samples subjected to white and brown rot fungi (*Trametes versicolor* and *Gloeophyllum separium*, respectively) in accordance with the European standard EN113 test.

In addition to the control specimens of *Pinus taeda* and *Pinus radiata* three groups of testing samples made according to the modified processes described in the embodiments of this invention were impregnated with a sodium silicate solution containing 5.49% $SiO_2$ with no other additives, a sodium silicate solution containing 5.49% $SiO_2$+0.6% Bio Oil I (aqueous phase of pyrolytic pine bark liquid), and a sodium silicate solution containing 5.49% $SiO_2$+0.4% sodium borate, respectively. The results are listed in Table 14 and Table 15 below.

TABLE 14

Weight loss and moisture content of samples subjected to the decay of brown and white rot fungi according to the 16-week EN 113 testing standard.

| Controls & Treated Specimens | White rot (*Trametes versicolor*) | | Brown rot (*Gloeophyllum separium*) | |
|---|---|---|---|---|
| | Moisture (%) | Weight loss (%) | Moisture (%) | Weight loss (%) |
| *Pinus taeda* - control | 21.6 | 16.81 | 19.4 | 26.18 |
| *Pinus radiata* - control | 22.9 | 19.98 | 29.7 | 30.37 |
| Sodium Silicate (5.49% $SiO_2$) | 64.0 | 4.01 | 61.9 | 4.91 |
| Sodium Silicate (5.49% $SiO_2$) + Bio Oil I (0.6%) | 58.2 | 9.49 | 61.2 | 6.63 |
| Sodium Silicate (5.49% $SiO_2$) + Sodium Borate (0.4%) | 60.1 | 5.92 | 62.7 | 4.12 |

TABLE 15

Relative % weight loss improvement of treated specimens compared against untreated control specimens.

| Controls & Treated Specimens | White Rot (*Trametes versicolor*) Weight Loss Improvement as compared to: | | Brown Rot (*Gloeophyllum separium*) Weight Loss Improvement as compared to: | |
|---|---|---|---|---|
| | *P. taeda* | *P. radiata* | *P. taeda* | *P. radiata* |
| *Pinus taeda* - control *Pinus radiata* - control | | | | |
| Sodium Silicate (5.49% SiO2) | 319% | 398% | 433% | 519% |
| Sodium Silicate (5.49% SiO2) + Bio Oil I (0.6%) | 77% | 111% | 295% | 358% |
| Sodium Silicate (5.49% SiO2) + Sodium Borate (0.4%) | 184% | 238% | 535% | 637% |

Table 14 illustrates the obvious benefits the Inventors' lumber modification treatment provides against white and brown rot decay. In the case of white rot (*Trametes versicolor*), the inventive modification process with sodium silicate impregnation solutions showed weight losses of 4.01% (with no other additives), 9.49% (with Bio Oil I), and 5.92% (with sodium borate), as compared to the controls of Pinus taeda and Pinus radiata showing weight losses of 16.81% and 19.98%, respectively. In the case of brown rot (*Gloeophyllum separium*), the inventive modification process with sodium silicate impregnation solutions showed weight losses of 4.91% (with no other additives), 6.63% (with Bio Oil I), and 4.12% (with sodium borate), as compared to the controls of *Pinus taeda* and *Pinus radiata* showing weight losses of 26.18% and 30.37%, respectively.

Table 15 illustrates the increased benefits in the context of the two controls. Large triple digit improvements in improved weight loss can be seen with a range of 77% to 637%, depending on treatment solution and the comparison control variable.

Figure 34:
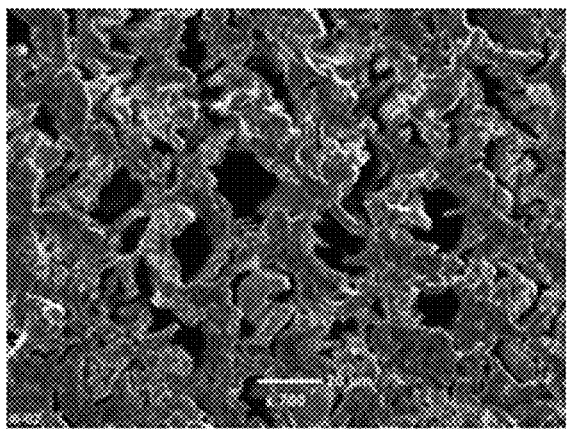
FIG. 34 shows microphotographs of specimen cross-sections after 16 weeks of fungal cultivation with various treatment solutions containing sodium silicate and other chemical agents; A) $SiO_{2+}$ Bio Oil I at 20 µm; B) $SiO_{2+}$ Bio Oil I at 50 µm; C) *Pinus taeda* Control at 100 µm; D) $SiO_{2+}$ sodium borate at 200 µm; and E) $SiO_2$ at 200 µm.
Figure 34:
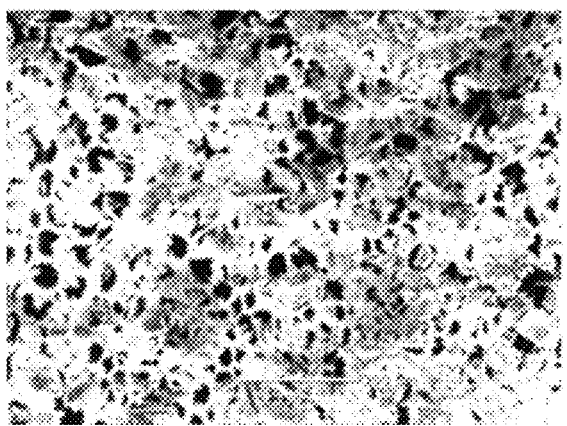
Figure 34:
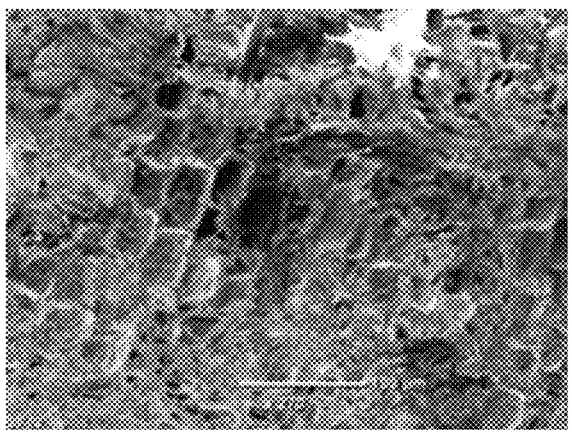
Figure 34:
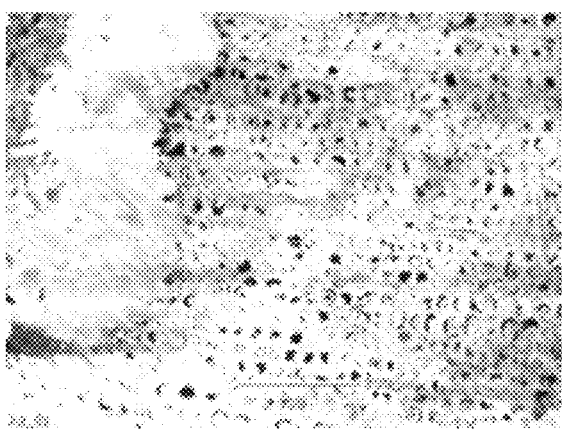
Figure 34:
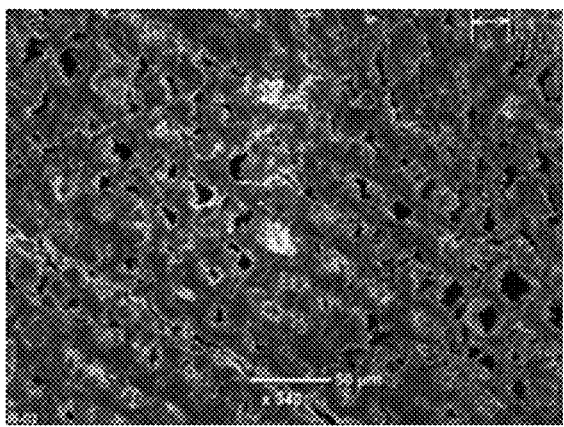

FIG. 34 shows the specimens treated with sodium silicate treatment solutions slowed fungal decay and limited damage to cell walls. A) and B) of FIG. 34 show month 1 and month 2, respectively, of specimens treated with the inventors' process (5.49% $SiO_2$+0.6% Bio Oil I) exposed to *G. separium* where a slowing of cellular wall damage is displayed despite an increased virulence of this fungus and an increased affinity of brown dry rot by conifer woods.

In comparison, C) of FIG. 34 shows a cross-section of a control sample taken from the middle of the specimen and illustrates deterioration of the cellular walls and prolific advancement of the fungus.

D) of FIG. 34 displays specimens treated with a sodium silicate solution containing 5.49% $SiO_{2+}$ a 0.4% concentration of sodium borate. E) of FIG. 34 displays a specimen treated with a sodium silicate solution containing 5.49% $SiO_2$ with no additional additives. Both specimens display an advanced ability to slow fungal advancement and cellular wall deterioration.

Example 5. Termite Resistance

Termites, although essential recyclers of carbon in tropical ecosystems, are serious structural pests in urban environments. Traditional termite management was based largely on the use of biocides, which did not require an intimate knowledge of the organism. Legal and socioeconomic pressures have forced many of the most effective (but equally environmentally damaging) toxicants out of the marketplace.

The original environmentally-persistent (persistent organic pollutant, POPs) termiticides (organochlorines) were effective and provided multiple decades of protection and were usually applied before construction. These were then replaced with less effective soil termiticides and insecticides used as barriers with approaches that ranged from killing large portions of the termite population to killing some portion of the population around the treatment boundary, causing a secondary repellency from necrophobia. These were required to be applied more frequently than the organochlorines. Additional approaches were added that included physical barriers, biological controls, physical control, and a range of baiting technologies. Most of these have had mixed results and continue to negatively impact the environment. In addition, construction lumber is pressure treated with various non-sustainable chemicals as a further method of termite control and with the long-term consequences of the chemicals eventually leaching back into the environment and losing their efficacy and thereby requiring additional treatments at the sites. See Woodrow and Grace, "Termite Control from the Perspective of the Termite: a 21st Century Approach," ACS Symposium Series, Vol. 982, American Chemical Society (Apr. 2, 2008), which is incorporated herein by reference in its entirety.

The inventors have focused their termite control strategy on the combination of a sustainable chemical in the wood that accomplishes both stable termite resistance without termite elimination and without long-term detrimental leaching of toxic chemicals into the environment. The inventors have been able to achieve both critical outcomes according to the modification process described in the embodiments of this invention, thereby creating a natural barrier product inside the cellulose structure of the wood itself such that the termites then do not want to forage on it. This combination is what makes the inventors' modified lumber approach uniquely effective against termites.

The following experiments have been conducted to evaluate the efficacy of the inventive process against termites in the field.

Figure 35:
FIG. 35 is an image showing operator holding a specimen treated by the inventive process, aged 6 months, at a termite field testing area. A 1"×1" by 18" stake shows no evidence of any termite attacks since measurements began.

A termite testing field was created consisting of SYP stakes. These are 18 of 2"×4"×18", (half modified using the inventive processes and half untreated), and 18 of 1"×1"×18", (half modified using the inventive process and half untreated), which is the lumber industry practice sized standard stake method. These samples were planted in a controlled field in Appling, Ga. and are monitored on a monthly basis. As of this date, the 2"×"4 stakes were in the ground for approximately 12 months, and the 1"×1" stakes, for approximately 6 months. To date, there has been no termite attacks on either of the 2×4 or 1×1 modified stake samples. As shown in FIG. 35, a specimen treated by the inventive process, aged 6 months, at a termite field testing area (a 1"×1" by 18" stake) shows no evidence of any termite attacks since measurements began.

No other methods were applied to deter termite colonies from the field area.

Example 6. TGA Test

TGA (thermographic analysis) test was used in this example to thermally destruct eight wood samples made according to the modification process described in the embodiments of this invention and four conventionally treated lumber samples. Samples of the 2×4 modified lumber (according to the modification process according to the embodiments of the invention) were sent to a reputable University Laboratory in North Carolina, where TGA tests were performed on the lumber, as compared to a control (untreated) SYP sample, as well as a conventionally (phosphate-based) treated lumber.

Figure 36A:
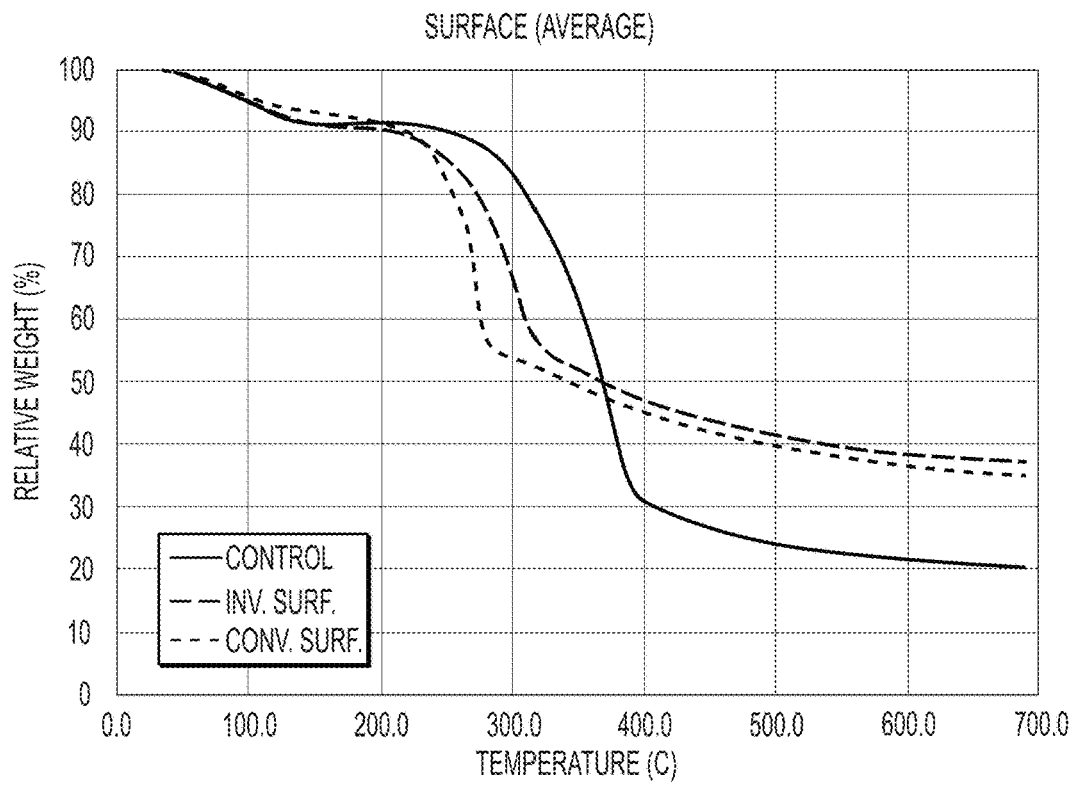
FIG. 36A and FIG. 36B show the average thermogram for samples taken from the surfaces (FIG. 36A) and the core (FIG. 36B) of the inventors' modified lumber samples and conventionally treated lumber samples, as compared to the untreated control.
Figure 36B:
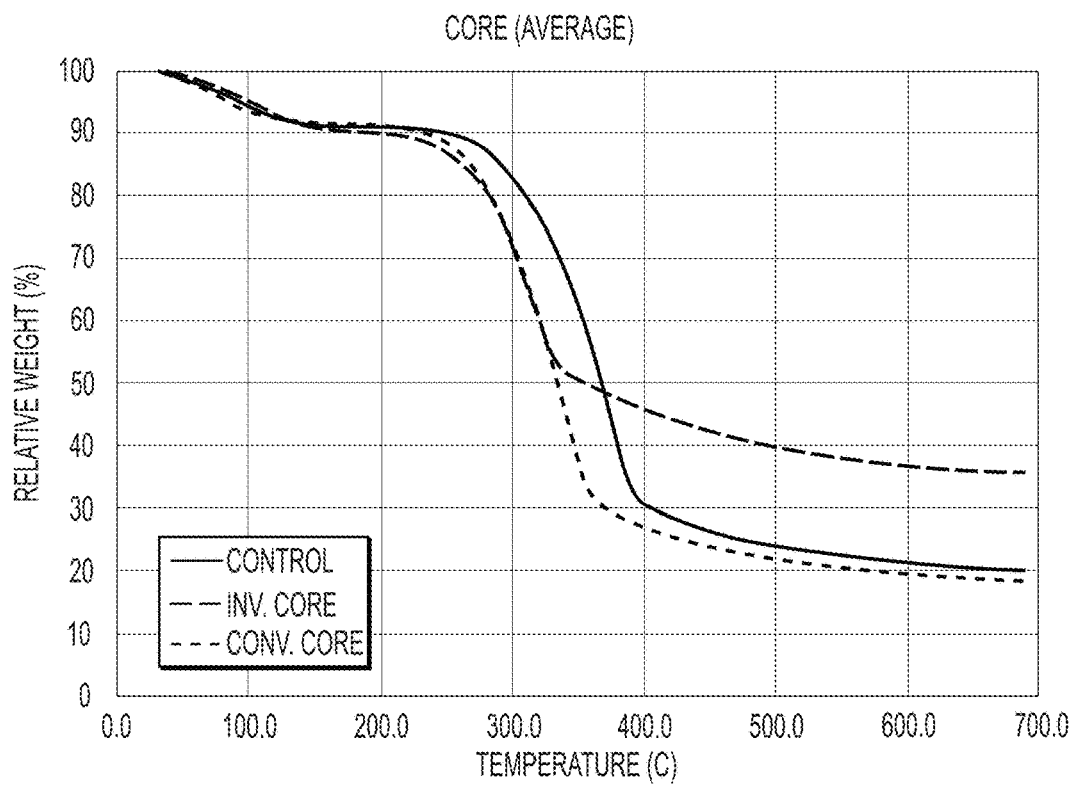

The data is presented in Table 16 and FIG. 36A and FIG. 36B.

TABLE 16

Thermograms for Inventor's modified lumber and conventionally treated lumber

| Sample | Residual Mass after Nitrogen Atmosphere (%) | Residual Mass after Air Atmosphere (%) |
|---|---|---|
| Control | 20.0 | 0.4 |
| Invention Surface | 37.1 | 11.4 |
| Invention Core | 35.9 | 10.1 |
| Conventional Surface | 34.9 | 5.4 |
| Conventional Core | 18.7 | 2.2 |

FIG. 36A and FIG. 36B show the average thermogram for samples taken from the surfaces and also the core of the Inventor's modified lumber samples and conventionally treated lumber samples. For the outermost surface (FIG. 36A), the Inventors' modified lumber samples had slightly higher levels of residual char (37.1% vs. 34.9%) than the conventionally treated samples, indicating slightly better fire performance. Both treatments performed better than the untreated control. The residual char levels for the samples taken from the core (FIG. 36B) were significantly different, with the Inventors' modified lumber sample performing much better than the conventionally treated sample (with 35.9% vs. 18.7% char residue). The core of the Inventors' modified lumber samples all performed better than the control, whereas the conventionally treated sample had a similar performance as the control.

These results show that the Inventor's modifications for lumber samples taken from the surface and core increased the residual char, which is an early indicator of fire resistance. These results also show that the conventionally treated samples taken from the core and exposed to either nitrogen or air atmosphere at 700° C. more easily degraded than the Inventors' core samples. Therefore, the results illustrate that the modification process provided an impregnation that penetrated into the 2×4 samples better than the conventional treatment.

We claim:

1. A process for modifying wood, comprising:
   treating the wood with an impregnating solution comprising sodium silicate, under conditions sufficient to impregnate the wood with one or more of the components of the impregnating solution, wherein the weight ratio of $SiO_2/(Na_2O)$ of the sodium silicate ranges from about 2.5 to about 3.5; and
   adding gaseous carbon dioxide to the treated wood, in the absence or presence of water, under pressure ranging from about 2 to about 12 bars, thereby lowering the pH of the treated wood to about 11 or below, to stabilize and/or fix the components of the impregnating solution in the wood,
   wherein the process is green, non-toxic as being carried out in the absence of a pesticide or biocide, or as being carried out with an environmentally safe boron level in the impregnating solution of no more than 1% by wt, and
   wherein the concentration of $SiO_2$ in the impregnating solution ranges from about 3% by wt. to about 15% by wt.

2. The process of claim 1, wherein the process is green, non-toxic as being carried out in the absence of a pesticide or biocide.

3. The process of claim 1, wherein the concentration of $SiO_2$ in the impregnating solution ranges from about 5% by wt. to about 15% by wt.

4. The process of claim 1, wherein the concentration of $SiO_2$ in the impregnating solution ranges from about 3% by wt. to about 6% by wt.

5. The process of claim 1, further comprising, prior to the treating step, a step of pretreating the wood by drying the wood and/or applying a vacuum to the wood, to achieve a moisture content of the wood of less than about 20%.

6. The process of claim 1, wherein the conditions sufficient to impregnate the wood in the treating step comprise two or more of the following conditions:
   applying a pressure of about 4 bars to about 20 bars;
   heating the wood at a temperature ranging from about 15 to about 100° C.; and/or treating the wood for a period of time from about 2 to about 4 hours.

7. The process of claim 6, wherein the conditions sufficient to impregnate the wood in the treating step comprise:
   the concentration of $SiO_2$ in the impregnating solution ranges from about 5% by wt. to about 10% by wt.;
   the weight ratio of $(SiO_2)/(Na_2O)$ of the sodium silicate in the impregnating solution ranges from about 2.8 to about 3.2;
   applying a pressure of about 10 bars to about 20 bars;
   heating the wood at a temperature ranging from about 50 to about 80° C.; and
   treating the wood for a period of time from about 2 to about 4 hours.

8. The process of claim 6, wherein the conditions sufficient to impregnate the wood in the treating step comprise:
   the concentration of $SiO_2$ in the impregnating solution ranges from about 10% by wt. to about 15% by wt.;
   the weight ratio of $(SiO_2)/(Na_2O)$ of the sodium silicate in the impregnating solution ranges from about 2.8 to about 3.2;
   applying a pressure of about 10 bars to about 20 bars;
   heating the wood at a temperature ranging from about 20 to about 50° C.; and
   treating the wood for a period of time from about 2 to about 4 hours.

9. The process of claim 1, wherein the gaseous carbon dioxide is added under a pressure ranging from about 6 to about 12 bar, for a period of time from about 15 to about 60 minutes, to lower the pH of the treated wood to about 9 or below.

10. The process of claim 1, further comprising, after the treating step, a step of applying a vacuum to the treated wood to remove residual impregnating solution from the surface of the treated wood and prepare the treated wood for post-treatment steps.

11. The process of claim 1, further comprising, after the treating step, heating the treated wood at a temperature ranging from about 50 to about 100° C., wherein the heating step comprises heating the treated wood with dry air, saturated water vapor, or hot water.

12. The process of claim 11, wherein the heating step has a duration of about 2 to about 6 days and comprises varying the rate of increasing the temperature to the stabilized drying temperature and the rate of decreasing the temperature to achieve the desired moisture level target.

13. A process for modifying wood, comprising:
   i) treating the wood with a first impregnating solution comprising sodium silicate, under conditions sufficient to impregnate the wood with one or more of the components of the first impregnating solution, wherein the weight ratio of $SiO_2/(Na_2O)$ of the sodium silicate ranges from about 2.5 to about 3.5 and the concentration of SiO2 in the first impregnating solution ranges from about 3% by wt. to about 15% by wt;
   ii) treating the wood with a second impregnating solution comprising sodium silicate at a concentration higher than the concentration of the first impregnating solution, for a period of time shorter than the treating step i), wherein the concentration of $SiO_2$ in the second impregnating solution ranges from about 10 to 15% by wt.;
   iii) carrying out one or more of the following post-treatment step(s) to stabilize and/or fix the components of the first and/or second impregnating solution in the wood:
      adding gaseous carbon dioxide to the treated wood, in the absence or presence of water, under a pressure ranging from about 2 to about 12 bars, thereby lowering pH of the treated wood to about 11 or below, and/or heating the treated wood at a temperature ranging from about 50 to about 100° C., wherein the post-treatment step iii) is carried out after the treating step i), prior to the treating step ii), and/or after the treating step ii), and optionally wherein the weight ratio of $SiO_2/(Na_2O)$ of the sodium silicate in the second impregnating solution ranges from about 2.5 to about 3.5.

14. The process of claim 13, wherein the treating step ii) comprises the following conditions:

treating the wood for a period of time from about 10 to about 30 minutes;

applying a pressure of about 2 to about 12 bars; and heating the wood at a temperature ranging from about 20 to about 70° C.

15. The process of claim 13, wherein the process is green, non-toxic as being carried out in the absence of a pesticide or biocide, or as being carried out with an environmentally safe boron level in the first or second impregnating solution of no more than 1% by wt.

16. The process of claim 13, wherein the conditions sufficient to impregnate the wood in the treating step i) comprise two or more of the following conditions:

applying a pressure of about 4 bars to about 20 bars;

heating the wood at a temperature ranging from about 15 to about 100° C.; and/or treating the wood for a period of time from about 2 to about 4 hours.

17. The process of claim 13, wherein the post-treatment step iii) comprises adding gaseous carbon dioxide to the treated wood, in the absence or presence of water, under a pressure ranging from about 2 to about 12 bars, thereby lowering pH of the treated wood to about 11 or below.

18. The process of claim 17, wherein the gaseous carbon dioxide is added under a pressure ranging from about 6 to about 12 bar, for a period of time from about 15 to about 60minutes, to lower the pH of the treated wood to about 9 or below.

19. The process of claim 13, wherein the post-treatment step iii) comprises heating the treated wood at a temperature ranging from about 50 to about 100° C., wherein the heating step comprises heating the treated wood with dry air, saturated water vapor, or hot water.

* * * * *